US008918195B2

(12) United States Patent
Ben-Yaacov et al.

(10) Patent No.: US 8,918,195 B2
(45) Date of Patent: Dec. 23, 2014

(54) MEDIA MANAGEMENT AND TRACKING

(75) Inventors: Yaacov Ben-Yaacov, Douglasville, GA (US); Boaz Ben-Yaacov, Douglasville, GA (US); Abraham Lieberman, Modi'in (IL)

(73) Assignee: Catch Media, Inc., Douglasville, GA (US)

(*) Notice: Subject to any disclaimer, the term of this patent is extended or adjusted under 35 U.S.C. 154(b) by 1552 days.

(21) Appl. No.: 11/607,163

(22) Filed: Dec. 1, 2006

(65) Prior Publication Data
US 2007/0162395 A1 Jul. 12, 2007

Related U.S. Application Data

(63) Continuation-in-part of application No. 11/261,687, filed on Oct. 28, 2005, which is a continuation-in-part
(Continued)

(51) Int. Cl.
| G06F 17/00 | (2006.01) |
| G06F 15/16 | (2006.01) |
| G06F 17/30 | (2006.01) |
| G06Q 30/02 | (2012.01) |
| G06F 21/10 | (2013.01) |

(52) U.S. Cl.
CPC .... G06F 17/30017 (2013.01); G06F 17/30775 (2013.01); G06Q 30/02 (2013.01); G06F 17/30772 (2013.01); G06F 21/10 (2013.01); G06F 17/30749 (2013.01); G06Q 30/0241 (2013.01)
USPC ............................................. 700/94; 709/202

(58) Field of Classification Search
USPC ............ 700/94; 455/3.06; 707/999.107, 916; 709/231, 243, 244, 202
See application file for complete search history.

(56) References Cited

U.S. PATENT DOCUMENTS

| 4,230,990 A | 10/1980 | Lert, Jr. et al. |
| 4,659,231 A | 4/1987 | Barkouki |

(Continued)

FOREIGN PATENT DOCUMENTS

| EP | 0 760 505 A2 | 3/1997 |
| EP | 1 016 991 A | 7/2000 |

(Continued)

OTHER PUBLICATIONS

EP Search Report for EP 09 16 2234, dated Jul. 31, 2009, 7 pages.
(Continued)

*Primary Examiner* — Davetta W Goins
*Assistant Examiner* — Daniel Sellers
(74) *Attorney, Agent, or Firm* — Blakely Sokoloff Taylor & Zafman LLP

(57) ABSTRACT

A system is described for enabling a user to listen to songs on a network-enabled device, including an embedded receiver for receiving at least one song list, and for receiving music streamed over a wireless network, list navigation software, for navigating the at least one song list and selecting a desired song therefrom, using a keypad communicatively coupled with the network-enabled device, an embedded transmitter for transmitting a song selection to a tracking server, and an embedded audio player, for playing the music streamed to the network-enabled device over the wireless network, a tracking server, including a data store including at least one song list, a receiver for receiving a song selection from said network-enabled device, the song selection comprising an ID for a selected song, and a transmitter for transmitting the at least one song list to the network-enabled device, and for transmitting the received song selection to a media server, and a media server, including a data store including audio files for the songs listed in the song list, an audio streamer, a receiver for receiving an instruction from said tracking server to transmit the selected song to the network-enabled device, and a transmitter for streaming the selected song to the network-enabled device. A method and a computer-readable storage medium are also described.

24 Claims, 22 Drawing Sheets

Related U.S. Application Data of application No. 10/893,473, filed on Jul. 16, 2004, which is a continuation-in-part of application No. 10/829,581, filed on Apr. 21, 2004, which is a continuation-in-part of application No. 10/336,443, filed on Jan. 2, 2003, now Pat. No. 7,191,193.

(56) References Cited

U.S. PATENT DOCUMENTS

| | | |
|---|---|---|
| 5,016,171 A | 5/1991 | Connolly et al. |
| 5,129,036 A | 7/1992 | Dean et al. |
| 5,161,251 A | 11/1992 | Mankovitz |
| 5,287,408 A | 2/1994 | Samson |
| 5,303,326 A | 4/1994 | Dean et al. |
| 5,715,403 A | 2/1998 | Stefik |
| 5,892,536 A | 4/1999 | Logan et al. |
| 5,892,900 A | 4/1999 | Ginter et al. |
| 5,918,213 A | 6/1999 | Bernard et al. |
| 5,946,664 A | 8/1999 | Ebisawa |
| 5,970,390 A | 10/1999 | Koga et al. |
| 6,088,455 A | 7/2000 | Logan et al. |
| 6,092,080 A | 7/2000 | Gustman |
| 6,142,375 A | 11/2000 | Belka et al. |
| 6,146,276 A | 11/2000 | Okuniewicz |
| 6,163,711 A | 12/2000 | Juntunen et al. |
| 6,202,060 B1 | 3/2001 | Tran |
| 6,266,654 B1 | 7/2001 | Schull |
| 6,336,219 B1 | 1/2002 | Nathan |
| 6,372,974 B1 | 4/2002 | Gross et al. |
| 6,389,162 B2 | 5/2002 | Maeda |
| 6,407,750 B1 | 6/2002 | Gioscia et al. |
| 6,449,367 B2 | 9/2002 | Van Wie et al. |
| 6,463,444 B1 | 10/2002 | Jain et al. |
| 6,567,984 B1 | 5/2003 | Allport |
| 6,591,085 B1 | 7/2003 | Grady |
| 6,608,930 B1 | 8/2003 | Agnihotri et al. |
| 6,615,192 B1 | 9/2003 | Tagawa et al. |
| 6,636,588 B2 | 10/2003 | Kimura et al. |
| 6,662,231 B1 * | 12/2003 | Drosset et al. ............ 709/229 |
| 6,671,494 B1 | 12/2003 | James |
| 6,697,944 B1 | 2/2004 | Jones et al. |
| 6,748,537 B2 | 6/2004 | Hughes |
| 6,771,748 B2 | 8/2004 | Parker et al. |
| 6,774,604 B2 | 8/2004 | Matsuda et al. |
| 6,774,796 B2 | 8/2004 | Smith |
| 6,834,308 B1 | 12/2004 | Ikezoye et al. |
| 6,847,950 B1 | 1/2005 | Kamibayashi et al. |
| 6,876,974 B1 | 4/2005 | Marsh et al. |
| 6,880,081 B1 | 4/2005 | Itkis |
| 6,888,950 B2 | 5/2005 | Siskin et al. |
| 6,934,837 B1 | 8/2005 | Jaisimha et al. |
| 6,947,598 B2 | 9/2005 | Yogeshwar et al. |
| 6,983,371 B1 | 1/2006 | Hurtado et al. |
| 7,006,424 B2 | 2/2006 | Nonaka et al. |
| 7,020,888 B2 | 3/2006 | Reynolds et al. |
| 7,046,239 B2 | 5/2006 | Asai et al. |
| 7,046,956 B1 | 5/2006 | Cohen |
| 7,073,063 B2 | 7/2006 | Peinado |
| 7,119,267 B2 | 10/2006 | Hirade et al. |
| 7,134,145 B1 | 11/2006 | Epstein |
| 7,158,842 B2 | 1/2007 | Ohmura et al. |
| 7,170,999 B1 * | 1/2007 | Kessler et al. ............ 380/277 |
| 7,188,186 B1 | 3/2007 | Meyer et al. |
| 7,191,193 B2 | 3/2007 | Ben-Yaacov et al. |
| 7,203,966 B2 | 4/2007 | Abburi et al. |
| 7,231,656 B1 | 6/2007 | Nathan |
| 7,281,034 B1 | 10/2007 | Eyal |
| 7,343,347 B2 | 3/2008 | Ostrover et al. |
| 7,363,372 B2 | 4/2008 | Potenzone et al. |
| 7,370,017 B1 | 5/2008 | Lindeman et al. |
| 7,389,273 B2 | 6/2008 | Irwin et al. |
| 7,415,439 B2 | 8/2008 | Kontio et al. |
| 7,440,365 B2 | 10/2008 | Hattori et al. |
| 7,512,549 B1 | 3/2009 | Morita et al. |
| 7,516,213 B2 | 4/2009 | Cunningham et al. |
| 7,523,312 B2 | 4/2009 | Kalker et al. |
| 7,600,266 B2 | 10/2009 | Thomas |
| 7,707,221 B1 | 4/2010 | Dunning et al. |
| 7,730,300 B2 | 6/2010 | Candelore |
| 7,756,792 B2 | 7/2010 | Hughes |
| 7,756,915 B2 | 7/2010 | Ben-Yaacov et al. |
| 7,761,176 B2 | 7/2010 | Ben-Yaacov et al. |
| 7,925,591 B2 | 4/2011 | Gajjala et al. |
| 2001/0018693 A1 | 8/2001 | Jain et al. |
| 2001/0051996 A1 | 12/2001 | Cooper |
| 2002/0007350 A1 * | 1/2002 | Yen ............................. 705/52 |
| 2002/0007351 A1 | 1/2002 | Hillegass et al. |
| 2002/0010759 A1 | 1/2002 | Hitson et al. |
| 2002/0015362 A1 | 2/2002 | Cowgill et al. |
| 2002/0032747 A1 | 3/2002 | Toki |
| 2002/0045960 A1 | 4/2002 | Phillips et al. |
| 2002/0066115 A1 | 5/2002 | Wendelrup |
| 2002/0068558 A1 | 6/2002 | Janik |
| 2002/0076051 A1 | 6/2002 | Nii |
| 2002/0077984 A1 | 6/2002 | Ireton |
| 2002/0077986 A1 | 6/2002 | Kobata et al. |
| 2002/0087887 A1 | 7/2002 | Busam et al. |
| 2002/0100062 A1 | 7/2002 | Lowthert et al. |
| 2002/0114466 A1 | 8/2002 | Tanaka et al. |
| 2002/0116277 A1 | 8/2002 | Kraft |
| 2002/0120456 A1 | 8/2002 | Berg et al. |
| 2002/0126762 A1 | 9/2002 | Tanaka |
| 2002/0138852 A1 | 9/2002 | Reynolds et al. |
| 2002/0157002 A1 | 10/2002 | Messerges et al. |
| 2002/0177914 A1 | 11/2002 | Chase |
| 2002/0184537 A1 | 12/2002 | Inokuchi et al. |
| 2002/0186844 A1 | 12/2002 | Levy et al. |
| 2002/0189427 A1 | 12/2002 | Pachet |
| 2003/0009423 A1 | 1/2003 | Wang et al. |
| 2003/0018491 A1 | 1/2003 | Nakahara et al. |
| 2003/0018582 A1 | 1/2003 | Yaacovi |
| 2003/0021441 A1 | 1/2003 | Levy et al. |
| 2003/0028622 A1 | 2/2003 | Inoue et al. |
| 2003/0040206 A1 | 2/2003 | Wang et al. |
| 2003/0050894 A1 | 3/2003 | Kambayashi et al. |
| 2003/0065642 A1 | 4/2003 | Zee |
| 2003/0076955 A1 | 4/2003 | Alve et al. |
| 2003/0078891 A1 | 4/2003 | Capitant |
| 2003/0079030 A1 | 4/2003 | Cocotis et al. |
| 2003/0079038 A1 | 4/2003 | Robbin et al. |
| 2003/0084126 A1 | 5/2003 | Kumar et al. |
| 2003/0084306 A1 | 5/2003 | Abburi et al. |
| 2003/0098817 A1 | 5/2003 | Choi |
| 2003/0110502 A1 | 6/2003 | Creed et al. |
| 2003/0120541 A1 | 6/2003 | Siann et al. |
| 2003/0131252 A1 | 7/2003 | Barton |
| 2003/0135513 A1 | 7/2003 | Quinn et al. |
| 2003/0154378 A1 | 8/2003 | Hirano |
| 2003/0158737 A1 | 8/2003 | Csicsatka |
| 2003/0163823 A1 | 8/2003 | Logan et al. |
| 2003/0172113 A1 | 9/2003 | Cameron et al. |
| 2003/0177073 A1 | 9/2003 | Ogai |
| 2003/0182184 A1 | 9/2003 | Strasnick et al. |
| 2003/0188150 A1 | 10/2003 | Ohkado et al. |
| 2003/0217057 A1 | 11/2003 | Kuroiwa et al. |
| 2003/0226012 A1 | 12/2003 | Asokan et al. |
| 2003/0229654 A1 | 12/2003 | Bibas et al. |
| 2003/0232593 A1 | 12/2003 | Wahlroos et al. |
| 2003/0233929 A1 | 12/2003 | Agnihotri et al. |
| 2004/0003281 A1 | 1/2004 | Sonoda et al. |
| 2004/0003398 A1 | 1/2004 | Donian et al. |
| 2004/0013125 A1 | 1/2004 | Betker et al. |
| 2004/0021704 A1 | 2/2004 | Mitsutake |
| 2004/0049559 A1 | 3/2004 | Saubade |
| 2004/0058649 A1 | 3/2004 | Grady |
| 2004/0064500 A1 | 4/2004 | Kolar et al. |
| 2004/0078338 A1 | 4/2004 | Ohta et al. |
| 2004/0089141 A1 | 5/2004 | Georges et al. |
| 2004/0089142 A1 | 5/2004 | Georges et al. |
| 2004/0117442 A1 | 6/2004 | Thielen |
| 2004/0121748 A1 | 6/2004 | Glaza |
| 2004/0128324 A1 | 7/2004 | Sheynman et al. |
| 2004/0128514 A1 * | 7/2004 | Rhoads ............................. 713/176 |
| 2004/0131255 A1 | 7/2004 | Ben-Yaacov et al. |

(56) References Cited

U.S. PATENT DOCUMENTS

| | | |
|---|---|---|
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0148191 A1 | 7/2004 | Hoke, Jr. |
| 2004/0158741 A1 | 8/2004 | Schneider |
| 2004/0187014 A1 | 9/2004 | Molaro |
| 2004/0199771 A1 | 10/2004 | Morten et al. |
| 2004/0224638 A1 | 11/2004 | Fadell et al. |
| 2004/0225612 A1 | 11/2004 | Shimojima et al. |
| 2004/0252966 A1 | 12/2004 | Holloway et al. |
| 2004/0253945 A1 | 12/2004 | Janik |
| 2004/0267390 A1 | 12/2004 | Ben-Yaacov et al. |
| 2005/0004873 A1 | 1/2005 | Pou et al. |
| 2005/0014536 A1 | 1/2005 | Grady |
| 2005/0015464 A1 | 1/2005 | Young |
| 2005/0055352 A1 | 3/2005 | White et al. |
| 2005/0065624 A1 | 3/2005 | Ben-Yaacov et al. |
| 2005/0071280 A1 | 3/2005 | Irwin et al. |
| 2005/0071663 A1 | 3/2005 | Medvinsky et al. |
| 2005/0120380 A1 | 6/2005 | Wolfe |
| 2005/0125087 A1 | 6/2005 | Ben-Yaacov et al. |
| 2005/0169114 A1 | 8/2005 | Ahn |
| 2005/0171938 A1 | 8/2005 | Fisher et al. |
| 2005/0210261 A1 | 9/2005 | Kamperman et al. |
| 2005/0210395 A1 | 9/2005 | Wakita et al. |
| 2005/0227679 A1 | 10/2005 | Papulov |
| 2006/0010075 A1 | 1/2006 | Wolf |
| 2006/0030961 A1 | 2/2006 | Lin |
| 2006/0031257 A1 | 2/2006 | Lipscomb et al. |
| 2006/0031558 A1* | 2/2006 | Ortega et al. ............... 709/232 |
| 2006/0107330 A1 | 5/2006 | Ben-Yaacov et al. |
| 2006/0122881 A1 | 6/2006 | Walker et al. |
| 2006/0217967 A1 | 9/2006 | Goertzen et al. |
| 2006/0242083 A1 | 10/2006 | Chavez |
| 2007/0030972 A1 | 2/2007 | Glick et al. |
| 2007/0038999 A1 | 2/2007 | Millington |
| 2007/0094276 A1 | 4/2007 | Isaac |
| 2007/0112678 A1 | 5/2007 | Himelfarb |
| 2007/0156762 A1 | 7/2007 | Ben-Yaacov et al. |
| 2007/0198426 A1 | 8/2007 | Yates et al. |
| 2007/0244794 A1 | 10/2007 | Fenley |
| 2007/0250403 A1 | 10/2007 | Altschuler |
| 2007/0271184 A1 | 11/2007 | Niebert et al. |
| 2008/0052516 A1 | 2/2008 | Tachibana et al. |
| 2008/0183595 A1 | 7/2008 | Sakamoto |
| 2008/0320598 A1 | 12/2008 | Ben-Yaacov et al. |
| 2008/0320605 A1 | 12/2008 | Ben-Yaacov et al. |
| 2009/0043412 A1 | 2/2009 | Ben-Yaacov et al. |
| 2009/0044285 A1 | 2/2009 | Ben-Yaacov et al. |
| 2009/0077190 A1 | 3/2009 | Gupta |
| 2009/0093899 A1 | 4/2009 | Ben-Yaacov et al. |
| 2009/0094663 A1 | 4/2009 | Ben-Yaacov et al. |
| 2009/0106451 A1 | 4/2009 | Zuckerman et al. |
| 2009/0248535 A1 | 10/2009 | Fisher et al. |
| 2010/0036759 A1 | 2/2010 | Ben-Yaacov et al. |
| 2010/0333211 A1 | 12/2010 | Schonfeld et al. |
| 2013/0060615 A1 | 3/2013 | Block et al. |
| 2013/0060616 A1 | 3/2013 | Block et al. |
| 2013/0060661 A1 | 3/2013 | Block et al. |

FOREIGN PATENT DOCUMENTS

| | | |
|---|---|---|
| EP | 1 074 926 A2 | 2/2001 |
| EP | 1 251 440 A2 | 10/2002 |
| EP | 1 304 874 A2 | 4/2003 |
| EP | 1 307 062 A1 | 5/2003 |
| EP | 1 898 323 A1 | 3/2008 |
| EP | 2 096 599 A1 | 9/2009 |
| EP | 2 098 973 A1 | 9/2009 |
| GB | 2 364 215 A | 1/2002 |
| GB | 2 380 364 A | 4/2002 |
| JP | 08-046538 | 2/1996 |
| JP | 08-152881 | 6/1996 |
| JP | 08-263440 | 10/1996 |
| JP | 10-308056 | 11/1998 |
| JP | 11-073730 | 3/1999 |
| JP | 11-122129 | 4/1999 |
| JP | 11-259964 | 9/1999 |
| JP | 2000-269904 | 9/2000 |
| JP | 2000-307527 | 11/2000 |
| JP | 2000-315177 | 11/2000 |
| JP | 2001-022843 | 1/2001 |
| JP | 2001-075871 | 3/2001 |
| JP | 2001-236081 | 8/2001 |
| JP | 2001-320373 | 11/2001 |
| JP | 2002-015147 | 1/2002 |
| JP | 2002-162973 | 6/2002 |
| JP | 2002-230895 | 8/2002 |
| JP | 2002-245066 | 8/2002 |
| JP | 2002-262254 | 9/2002 |
| JP | 2002-351744 | 12/2002 |
| JP | 2002-359803 | 12/2002 |
| JP | 2003-114949 | 4/2003 |
| JP | 2003-124921 | 4/2003 |
| JP | 2003-338976 | 11/2003 |
| JP | 2003-339000 | 11/2003 |
| JP | 2003-536144 | 12/2003 |
| JP | 2004-517377 | 6/2004 |
| JP | 2004-185172 | 7/2004 |
| JP | 2005-071522 | 3/2005 |
| JP | 2005-517238 | 6/2005 |
| JP | 2005-539469 | 12/2005 |
| JP | 2006-515099 | 5/2006 |
| WO | WO 00/07310 A1 | 2/2000 |
| WO | WO 00/45291 A1 | 8/2000 |
| WO | WO 00/58963 A2 | 10/2000 |
| WO | WO 01/13311 A | 2/2001 |
| WO | WO 01/25948 A1 | 4/2001 |
| WO | WO 01/46783 A2 | 6/2001 |
| WO | WO 01/53963 A1 | 7/2001 |
| WO | WO 01/62004 A2 | 8/2001 |
| WO | WO 01/63822 A2 | 8/2001 |
| WO | WO 01/95206 A1 | 12/2001 |
| WO | WO 02/31618 A2 | 4/2002 |
| WO | WO 03/005145 A2 | 1/2003 |
| WO | WO 03/034408 A2 | 4/2003 |
| WO | WO 03/058410 A1 | 7/2003 |
| WO | WO 2004/027588 A2 | 4/2004 |
| WO | WO 2004/061547 A2 | 7/2004 |
| WO | WO 2004/070538 A2 | 8/2004 |
| WO | WO 2005/106876 A2 | 11/2005 |
| WO | WO 2006/019608 A1 | 2/2006 |
| WO | WO 2006/058149 A2 | 6/2006 |
| WO | WO 2008/070062 A2 | 6/2008 |
| WO | WO 2007/055845 A2 | 7/2008 |

OTHER PUBLICATIONS

Office Action for U.S. Appl. No. 12/337,598, mailed Feb. 18, 2011, 10 pgs.
Office Action for Australian Application No. 2007328241, mailed Jul. 13, 2010, 2 pgs.
PCS Electronics, "RDS Max 2.0", XP002336990, retrieved from the Internet: http://web.archive.org/web/20040413050058/www.ppcs-electronics.com/en/products.php?sub=EDS_encod>, 3 pgs., (Mar. 22, 2004).
Amazon.com Description, "HP Jordana 545 Pocket PC", XP002336991, retrieved from the Internet: http://www.pdasupport.com/Jordana545.htm>, 3 pgs., (Apr. 2000).
Richard Menta, et al., "Review: Neuros MP3 Digital Audio Computer", MP3newswire.net, XP002336992, retrieved from the Internet: http://www.mp3newswire.net/stories/2003/neuros.html>, 6 pgs., (May 29, 2003).
Philips Research, "Audio Fingerprinting for Automatic Music Recognition", XP002347089, retrieved from the Internet: http://www.research.philips.com/initiatives/contentid/downloads/audio_fingerprinting_leaflet.pdf>, 2 pgs., (Mar. 2004).
Jaap Haitsma, et al., "A Highly Robust Audio Fingerprinting System", XP002347090, IRCAM, retrieved from the Internet: http://ismir2002.ismir.net/proceedings/02-FP04-2.pdf, 9 pgs., (2002).
Internet Article, "IPOD Track Display", XP00236993, retrieved from the Internet: http://halfbakery.com/idea/IPOD_20track_20display>, 2 pgs., (Sep. 18, 2003).

(56) References Cited

OTHER PUBLICATIONS

Internet Article, "MINI2 Forums—RDS—Radio Text", XP002336994, retrieved from the Internet: http://www.mini2.com/forum/archive/index.php/t-24296>, 3 pgs., (Feb. 7, 2003).
Internet Article, "Digiana AudiaX FM Linker", XP002337103, retrieved from the Internet: http://www.i4u.com/article396.html>, 1 pg., (May 30, 2003).
Julie Strietelmeier, "Gadgeteer Hands on Review: Apple iPod (3rd Generation 30GB Model)", The Gadgeteer, retrieved from the Internet on Jun. 21, 2008: http://web.archive.org/web/20030622180433/ www.the-gadgeteer.com/apple-ipod-30gb-review.html, 10 pgs., (Jun. 6, 2003).
Staff, "Griffin Technology Ships New iTrip for 3rd Generation iPods", The Mac Observer, retrieved from the Internet on Jun. 21, 2008: http://web.archive.org/web/20040109234748/http://www.macobservercom/article/2003/10/08.5shtml, 2 pgs., (Oct. 8, 2003).
David Carey, "Apple's iPod Packs a Pricey Punch", TechOnline, retrieved from the Internet on Feb. 13, 2009: http://www.techonline.com/article/printArticle.jhtml?articleID=193100821, 3 pgs., (Mar. 26, 2002).
Office Action for U.S. Appl. No. 10/336,443, mailed Oct. 4, 2004, 13 pgs.
Office Action for U.S. Appl. No. 10/336,443, mailed May 17, 2005, 16 pgs.
Office Action for U.S. Appl. No. 10/336,443, mailed Oct. 21, 2005, 17 pgs.
Office Action for U.S. Appl. No. 10/336,443, mailed May 31, 2006, 20 pgs.
Office Action for U.S. Appl. No. 11/708,997, mailed Feb. 9, 2009, 15 pgs.
Office Action for U.S. Appl. No. 11/708,997, mailed Sep. 28, 2009, 21 pgs.
Office Action for U.S. Appl. No. 10/829,581, mailed Jun. 27, 2008, 14 pgs.
Office Action for U.S. Appl. No. 10/829,581, mailed Feb. 18, 2009, 13 pgs.
Office Action for U.S. Appl. No. 10/829,581, mailed Aug. 14, 2009, 15 pgs.
Office Action for U.S. Appl. No. 10/829,581, mailed Feb. 4, 2010, 15 pgs.
Office Action for U.S. Appl. No. 10/829,581, mailed Jul. 20, 2010, 13 pgs.
Office Action for U.S. Appl. No. 10/829,581, mailed Feb. 2, 2011, 13 pgs.
Office Action for U.S. Appl. No. 12/337,600, mailed Jan. 24, 2011, 15 pgs.
Office Action for U.S. Appl. No. 10/893,473, mailed Jan. 9, 2009, 9 pgs.
Office Action for U.S. Appl. No. 10/893,473, mailed Jul. 21, 2009, 13 pgs.
Office Action for U.S. Appl. No. 10/893,473, mailed Mar. 3, 2010, 16 pgs.
Office Action for U.S. Appl. No. 10/893,473, mailed Aug. 3, 2010, 16 pgs.
Office Action for U.S. Appl. No. 12/252,926, mailed Oct. 6, 2010, 15 pgs.
Office Action for U.S. Appl. No. 12/252,941, mailed Nov. 12, 2010, 12 pgs.
Office Action for U.S. Appl. No. 11/261,687, mailed Oct. 20, 2008, 10 pgs.
Office Action for U.S. Appl. No. 11/261,687, mailed Jul. 9, 2009, 11 pgs.
Office Action for U.S. Appl. No 11/261,687, mailed Oct. 27, 2009, 3 pgs.
Office Action for U.S. Appl. No. 10/997,606, mailed Apr. 14, 2008, 27 pgs.
Office Action for U.S. Appl. No. 10/997,606, mailed Oct. 27, 2008, 21 pgs.
Office Action for U.S. Appl. No. 10/997,606, mailed Jun. 26, 2009, 15 pgs.

M. Nilsson, "ID3 tag version 2.4.0—Native Frames," XP002350036, ID3V2.4.0-frames.txt, v 1.1. Retrieved from the Internet: http:www/id3.org/id3v2.4.0-frames.txt (Nov. 1, 2000).
"GoTuit Media Secures $2.1 Million in First-Round Angel Funding Led by Topol Group," PR Newswire, pNA (Aug. 15, 2000).
"Wikipedia: Fairplay," XP-002414372, Wikipedia, The Free Encyclopedia (Online), 4 pgs. (Oct. 11, 2005).
R. Mori, et al., "Superdistribution: An Electronic Infrastructure for the Economy of the Future," XP002072402, Joho Shori Gakkai Ronbunshi—Transactions of Information Processing Socit of Japan, vol. 38, No. 7 pp. 1465-1472 (Jul. 1997).
PCT Notification Concerning Transmittal of International Preliminary Report on Patentability (Chapter 1 of the Patent Cooperation Treaty) for PCT Counterpart Application No. PCT/US2006/039107 Containing International Search Report, 12 pages (Jul. 10, 2008).
PCT Notification of Transmittal of the International Search Report and the Written Opinion of the International Searching Authority or the Declaration for PCT Counterpart Application No. PCT/US2006/039107 Containing International Search Report, 22 pgs (Nov. 20, 2007).
PCT Invitation to Pay Additional Fees for PCT Counterpart Application No. PCT/US2007/024813 Containing International Search Report (Aug. 8, 2008).
Office Action for U.S. Appl. No. 12/337,598, mailed Sep. 6, 2011, 13 pgs.
Office Action for U.S. Appl. No. 12/337,600, mailed Jul. 8, 2011, 15 pgs.
Office Action for U.S. Appl. No. 12/252,926, mailed May 24, 2011, 15 pgs.
Office Action for U.S. Appl. No. 12/252,926, mailed Oct. 7, 2011, 16 pgs.
Office Action for U.S. Appl. No. 12/252,941, mailed May 10, 2011, 12 pgs.
Office Action for U.S. Appl. No. 12/252,941, mailed Jul. 25, 2011, 3 pgs.
Office Action for U.S. Appl. No. 12/200,586, mailed Oct. 3, 2011, 20 pgs.
Office Action for U.S. Appl. No. 12/200,606, mailed Jun. 20, 2011, 15 pgs.
Office Action for U.S. Appl. No. 12/200,606, mailed Jan. 26, 2012, 19 pgs.
Office Action for Australian Application No. 2011203040, mailed Oct. 17, 2011, 2 pgs.
Tony Bove, "The iPod Companion". Muska & Lipman, 27 pgs. (including Table of Contents, ix, 1-21, 3, and 80), (2003).
Antonin Billet, "PDA: Ie Sypod veut séduire par le multimédia", retrieved from the Internet: http://www.01net.com/editorial/175530/pda-ie-sypod-veut-seduire-par-le-multimedia/, 3 pgs. (including Google translation), (Feb. 2, 2004).
"Songs-DB 1.3", Soft32, retrieved from the Internet: http://songs-db.soft32.com/, 5 pgs., (Jun. 14, 2003).
Internetnews.com Staff, "Songcatcher Snatches Tunes From Live Radio", retrieved from the Internet: http://www.internetnews.com/ec-news/print.php/532651, 1 pg., (Dec. 12, 2000).
Office Action for U.S. Appl. No. 12/337,598, mailed Oct. 1, 2012, 13 pgs.
Office Action for U.S. Appl. No. 12/252,926, mailed Apr. 4, 2012, 15 pgs.
Office Action for U.S. Appl. No. 12/200,586, mailed Jun. 14, 2012, 14 pgs.
Office Action for Japanese Application No. 2009-539370, mailed Feb. 16, 2012, 7 pgs. (including English translation).
Office Action for Israel Application No. 198913, mailed Oct. 9, 2012, 7 pgs., (including English Language Summary of the Office Action).
Dennis Lloyd, "Griffin iTrip", iLounge, retreived from the Internet on Dec. 13, 2012: http://www.ilounge.com/index.php/reviews/entry/griffin-itrip-ipod/, 6 pgs., (May 8, 2003).
Office Action for U.S. Appl. No. 10/829,581, mailed Mar. 29, 2013, 19 pgs.
Office Action for U.S. Appl. No. 12/337,598, mailed Jun. 4, 2013, 17 pgs.
Office Action for U.S. Appl. No. 12/337,600, mailed Apr. 24, 2013, 15 pgs.
Office Action for U.S. Appl. No. 12/495,766, mailed Mar. 6, 2013, 20 pgs.

\* cited by examiner

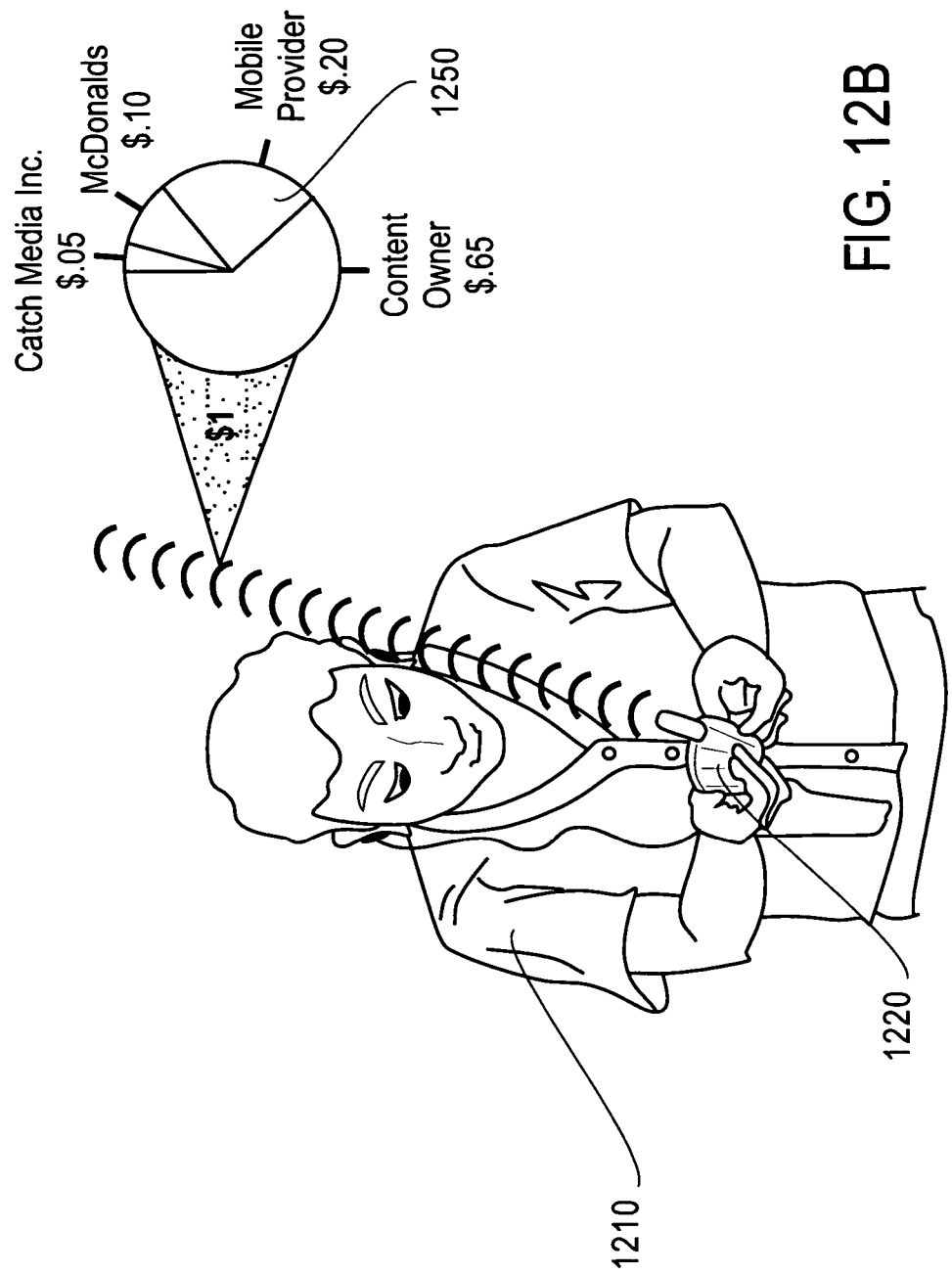

MEDIA MANAGEMENT AND TRACKING

CROSS REFERENCES TO RELATED APPLICATIONS

This application is a continuation-in-part of assignee's pending application U.S. Ser. No. 11/261,687, filed on Oct. 28, 2005, entitled "Method and System for Tracking and Managing Rights for Digital Music," which is a continuation-in-part of assignee's application U.S. Ser. No. 10/893,473, filed on Jul. 16, 2004, entitled "Method and System for Managing Rights for Digital Music," which is a continuation-in-part of assignee's pending application U.S. Ser. No. 10/829,581, filed on Apr. 21, 2004, entitled "Portable Music Player and Transmitter," which is a continuation-in-part of assignee's application U.S. Ser. No. 10/336,443, filed on Jan. 2, 2003, entitled "Automatic Digital Music Library Builder," now U.S. Pat. No. 7,191,193.

FIELD

Embodiments of the present invention relate to rights management for use and transfer of digital music recordings.

BACKGROUND

Consumers are generally aware to some extent of copyright laws concerning digital recordings, but there are no automatic features in place to assist consumers in abiding with them. For example, a consumer who purchases a song on a CD, or through a subscription with an Internet music sharing service such as Napster, generally does not know if he is permitted to make personal copies of the song for himself, on one or more of his computers, or on one or more CDs, or on one or more MP3 players.

Digital rights management (DRM) technology addresses this concern by encapsulating songs within a DRM wrapper. The DRM wrapper, which is generally encrypted, specifies whether or not a specific device has the necessary rights to play a specific song. Hardware or software within the player then enables or disables playing of the song accordingly. Generally, DRM systems only enable playing of a song on a device if the owner of the device has purchased a license for the song. If the owner of the device has not purchased a license for the song and wishes to do so, and if the device is connected via a computer network to a licensing authority, referred to as a "clearing house," then the owner may purchase a license from the clearing house, in which case the DRM wrapper is updated so as to reflect current ownership.

A disconnected device, however, generally cannot purchase such a license unless the disconnected device connects with a connected device that can access a clearing house. As such, the disconnected device cannot play a song that is not licensed by the owner of the device, when the owner is not located at a point of connection.

For marketing purposes, it would be beneficial if disconnected devices could play trial versions of songs that are not licensed by the device owners, and if such trial versions could be copied as trial versions from one disconnected device to another. The owners of the disconnected devices could then listen to the trial versions of the songs and afterwards, if they wish to purchase licenses to the songs, could do so by connecting their disconnected devices to a connected device, at their convenience, and purchasing licenses from a clearing house.

It would thus be beneficial if a merchandising system was in place to manage digital rights for songs that are obtained as trial versions, copied from device to device, and subsequently converted to fully licensed versions.

It would also be beneficial to track the history of license purchases within such a merchandising system, as trial versions of songs are copied from device to device through a sharing chain of friends, some of whom eventually purchase licenses to the trial versions. In particular, tracking of licensing history would enable a profit-sharing arrangement whereby a portion of the payment paid by a person along the sharing chain is allotted to the original clearing house or vendor from which a song was licensed.

Additionally, it would be beneficial for an owner of digital music to be able to listen to his music on networked devices that do not store digital copies of the music itself. Such benefit would enable the owner to access his music while away from his home, essentially anywhere: The owner could then listen to his music on cell phones, networked portable media players and public access devices such as media center devices in hotel rooms, whether or not such devices belong to the owner.

SUMMARY OF THE DESCRIPTION

Embodiments of the present invention concern a configurable method and system for managing copyright privileges when a digital work is copied or streamed from one device to another, and for allowing the owner of a digital work to enjoy the work on a plurality of devices, inside the owner's home and outside, whether or not the devices belong to the owner. Embodiments of the present invention apply to many forms of digital copyright works, including inter alia songs, movies and pictures. The ensuing description refers primarily to digital songs, for the sake of clarity.

In a general setting, digital songs are (i) acquired from external sources, including inter alia Internet music services such as iTunes® and Napster®, CDs and other recording media, music kiosks and broadcast music stations such as cable and satellite stations; and thereafter (ii) copied between digital audio recorders and digital audio players. Transfer of songs may be likened in some respects to a virtual water distribution system with nodes and conduits, wherein the nodes store water and the conduits transmit water from one node to another. External nodes represent music sources such as record stores, kiosks and Internet music services; and internal nodes represent audio recorders and players.

Within this paradigm of water distribution, digital rights management concerns controlling valves that restrict the flow of water within the pipes, and controlling access to the water in the nodes.

In an embodiment of the present invention,
  digital audio devices may be registered with one another; and
  songs stored within recorders and players are labeled as being "Purchased," "Recorded" or "Try & Buy."

For one embodiment, digital audio players are registered with either zero or one digital audio recorder. In other words, a digital player cannot be registered with more than one recorder, but one digital recorder can have multiple digital players registered therewith.

For one embodiment, the label of a song is used to identify copyrights associated therewith. The Try & Buy label is used for promotional or trial versions of songs, which generally include an expiration event, upon occurrence of which the song "evaporates"; i.e., can no longer be played in its entirety. For example, a listener may be enabled to play a Try & Buy song for a limited number of times, or for a limited time span. After the song has expired, it cannot be played further. However, the listener can generally purchase the song through an appropriate device, including inter alia a kiosk, a cellular phone, or a PC computer connected to the Internet.

For one embodiment of the invention, copyright management is achieved by (i) restricting a song from being copied from a source device to a target device; and (ii) specifying the way a song is labeled within a target device when the song is copied from a source device to the target device—based on the source device, the target device, the label of the song in the source device, and based on whether or not the source and target device are commonly registered.

Further, in an alternate embodiment of the invention, copyright management may restrict the number of copies permitted to be made for a song resident on a source device. For example, when a recorder is used to copy songs to a plurality of players, up to three copies of a song may be permitted.

Thus it may be appreciated that embodiments of the invention enable audio device manufacturers to configure a flexible logic for digital rights management in accordance with legal requirements in their respective locales. Various such configurations are described in the detailed description hereinbelow.

Embodiments of the present invention may be implemented in conjunction with third-party digital rights management systems, in order to comply with third-party DRM rules and in order to ensure backward compatibility with third-party players. As such, embodiments of the present invention provide an enhancement to conventional DRM systems, within conventional architectures.

Embodiments of the present invention may also be used advantageously for tracking usage and merchandising. Specifically, a first user purchases a license to a digital work. Subsequently the digital work is copied from device to device along a sharing chain of friends, one friend sharing with the next friend. The shared copies are Try & Buy copies, which can only be accessed in limited ways. Some or all of the friends along the chain may eventually purchase their copy of the digital work, converting it from a Try & Buy copy to an owned copy. Using an embodiment of the present invention, when such a friend purchases a license to convert a shared Try & Buy copy of the digital work into an owned copy, information as to the original source of purchase as well as the friend's usage is tracked. This information can be used inter alia to allot a portion of the payment received from the friend to the original source of purchase, and to aggregate usage and purchase statistics.

In distinction from embodiments of the present invention, prior art digital rights managers do not include the feature of adapting labels from source label to target label when a song is copied from a source device to a target device. One such prior art digital rights manager is Microsoft Corporation's Windows Media Rights Manager, which implements digital rights by encrypting audio files using keys, and packaging the files with key IDs. In order to play the audio files, a user obtains a license, which contains a key to decrypt the file.

Another such prior art digital rights manager is Apple Corporation's iTunes rights manager, which registers iPod music players with computers, so that an iPod cannot download an MP3 song from a computer that it is not registered with.

Embodiments of the present invention may be used for enabling a mobile user who is away from home to access and navigate playlists of songs stored on his home PC or other home media device, using his cellular telephone, and to select songs for listening. The selected songs are then streamed to an embedded player in the user's cellular telephone upon demand, from one or more media servers.

Embodiments of the present invention may also be used for programmed advertising. As part of an advertising campaign, a sponsor distributes free portable media players, or free songs, to a targeted set of users. In addition, audio files for advertisements are also distributed to the users' media players as part of the campaign, and programmed for automatic playback when conditions specified by the sponsor are satisfied for the players. Embodiments of the present invention provide a flexible interface for distributing songs to specific players, and for associating one or more programmed advertisements with individual songs, with groups of songs, or with specific players.

There is thus provided in accordance with an embodiment of the present invention a system for enabling a user to listen to songs on a network-enabled device, including a network-enabled device, including an embedded receiver for receiving at least one song list, and for receiving music streamed over a wireless network, list navigation software, for navigating the at least one song list and selecting a desired song therefrom, using a keypad communicatively coupled with the network-enabled device, an embedded transmitter for transmitting a song selection to a tracking server, and an embedded audio player, for playing the music streamed to the network-enabled device over the wireless network, a tracking server, including a data store including at least one song list, a receiver for receiving a song selection from said network-enabled device, the song selection comprising an ID for a selected song, and a transmitter for transmitting the at least one song list to the network-enabled device, and for transmitting the received song selection to a media server, and a media server, including a data store including audio files for the songs listed in the song list, an audio streamer, a receiver for receiving an instruction from said tracking server to transmit the selected song to the network-enabled device, and a transmitter for streaming the selected song to the network-enabled device.

There is further provided in accordance with an embodiment of the present invention a method for a network-enabled device to play songs, including transmitting a play request from a network-enabled device to a tracking server, receiving at least one song list from the tracking server, providing a user interface that enables a user to navigate the at least one song list and to select a desired song, using a keypad communicatively coupled with the network-enabled device, transmitting an ID of the selected song to the tracking server, receiving streamed audio data for the selected song from a media server, and playing the streamed audio data on an audio player embedded in the network-enabled device.

There is yet further provided in accordance with an embodiment of the present invention a method for a tracking server to cause music to be streamed to a network-enabled device, including receiving a play request from a network-enabled device, sending at least one song list to the network-enabled device, in response to the received play request, receiving a selection request from the network-enabled device with an ID for a selected song, and sending an instruction to a media server to stream the selected song to the network-enabled device.

There is moreover provided in accordance with an embodiment of the present invention a system for enabling a user to listen to songs on a network-enabled device, including a network-enabled device, including an embedded receiver for receiving music streamed over a wireless network, list navigation software, for navigating at least one song list and selecting a desired song therefrom, using a keypad communicatively coupled with the network-enabled device, an embedded transmitter for transmitting the song selection to a tracking server, and an embedded audio player, for playing the music streamed to the network-enabled device over the wireless network, a tracking server, including a receiver for receiving a song selection from the network-enabled device, the song selection comprising an ID for a selected song, and a transmitter for transmitting the received song selection to a media server, and a media server, including a data store including audio files for the songs listed in the song list, an audio streamer, a receiver for receiving an instruction from said tracking server to transmit the selected song to the network-enabled device, and a transmitter for streaming the selected song to the network-enabled device.

There is additionally provided in accordance with an embodiment of the present invention a method for a network-enabled device to play songs, including providing a user interface that enables a user to navigate at least one song list and to select a desired song, using a keypad communicatively coupled with a network-enabled device, transmitting an ID of the selected song to a tracking server, receiving streamed audio data for the selected song from a media server, and playing the streamed audio data on an audio player embedded in the network-enabled device.

There is further provided in accordance with an embodiment of the present invention a method for a tracking server to cause music to be streamed to a network-enabled device, including receiving a selection request from a network-enabled device with an ID for a selected song, and sending an instruction to a media server to stream the selected song to the network-enabled device.

There is yet further provided in accordance with an embodiment of the present invention a system for deploying advertisements on portable music players, including a portable music player, including a database of audio advertisements and playback rules therefor, wherein playback rules are used to govern when to play advertisements, an ad updater for periodically receiving advertisements and playback rules, and an ad scheduler for scheduling playback of advertisements in accordance with their playback rules, a host device that is periodically communicatively coupled with the portable music player, including a database of audio advertisements and playback rules therefore, an ad provisioner for transferring ads and playback rules to the portable music player, when the portable music player is communicatively coupled with the host device, an ad updater for receiving advertisements and playback rules from time to time, and an advertising server that is communicatively coupled with the host device, including a database of information about advertisers and their advertising campaigns, and for storing audio advertisements, distribution rules therefor and playback rules therefore, an ad provisioner for transferring ads and playback rules to the host device, and a web interface for receiving advertisements and playback rules for an advertising campaign, from an advertiser's computer.

There is moreover provided in accordance with an embodiment of the present invention a portable music player, including a database of audio advertisements and playback rules therefor, wherein the playback rules are used to govern when to play the advertisements, and wherein each one of the playback rules includes a condition and an advertisement, or a condition and a plurality of advertisements, an ad updater for receiving advertisements and playback rules related to an advertising campaign, an ad scheduler for periodically evaluating the playback rule conditions, and for scheduling playback of the advertisements in accordance with the playback rules, and a tracking engine for maintaining a history of advertisements played, and for periodically uploading the history to a server computer and clearing the history thereafter.

There is additionally provided in accordance with an embodiment of the present invention a method for deploying advertisements within portable music players, including uploading a plurality of audio advertisements and a plurality of playback rules to a server computer, the plurality of advertisements and the plurality of playback rules being designated for deployment in a plurality of portable music players, wherein playback rules are used to govern when to play advertisements, transmitting the plurality of advertisements and the plurality of playback rules to a host device into which at least one of the plurality of portable music players is periodically docked, transmitting at least one advertisement and at least one playback rule from the host device to each of at least one portable music players, when such portable music player is docked in the host device, periodically evaluating at least one playback rule, in each of the plurality of portable music players, and playing at least one advertisement according to the periodically evaluating, in each of the plurality of portable music players.

BRIEF DESCRIPTION OF THE DRAWINGS

Embodiments of the present invention will be more fully understood and appreciated from the following detailed description, taken in conjunction with the drawings in which like references indicate similar elements and in which:

FIGS. 12A and 12B are simplified illustrations of a first consumer use case of acquiring a song in accordance with an embodiment of the present invention;

The following definitions are employed throughout the specification.

Figure 2:
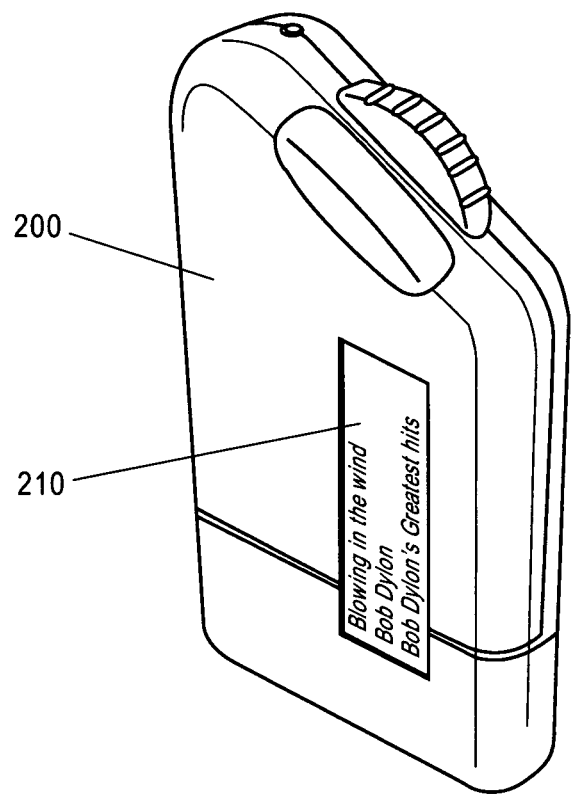
FIG. 2 is a side view of a music player, referred to as an "Egg", in accordance with an embodiment of the present invention.
Figure 3:
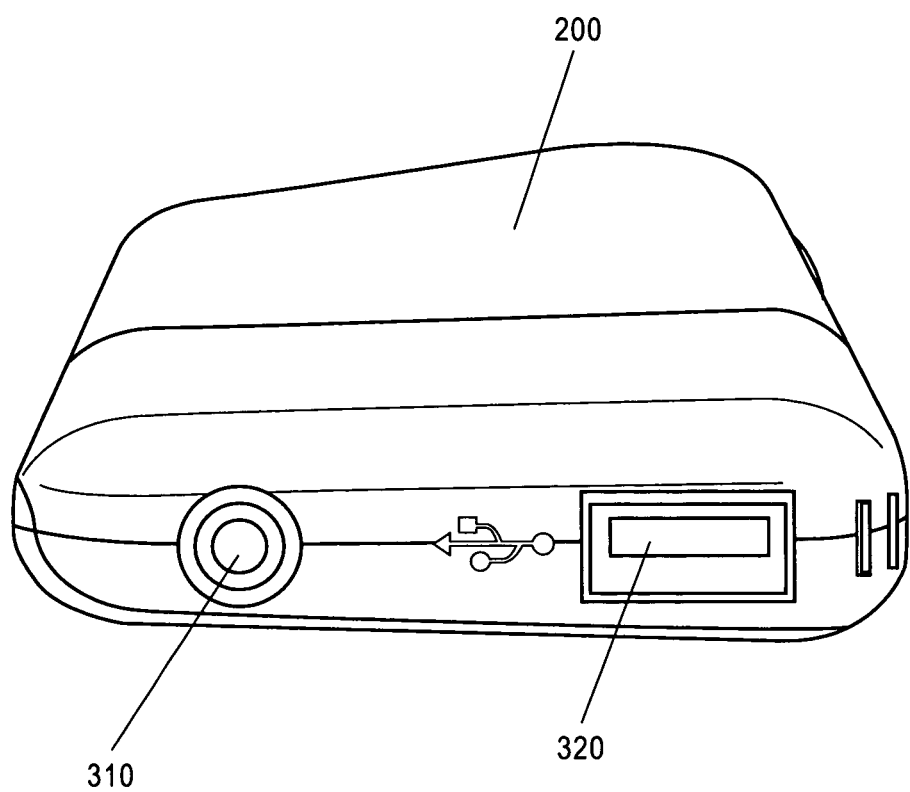
FIG. 3 is a bottom view of the music player of FIG. 2, in accordance with an embodiment of the present invention.

EGG—a small portable digital music player, such as the player illustrated in FIGS. 2 and 3; an Egg is generally registered with a Nest.

Figure 1:
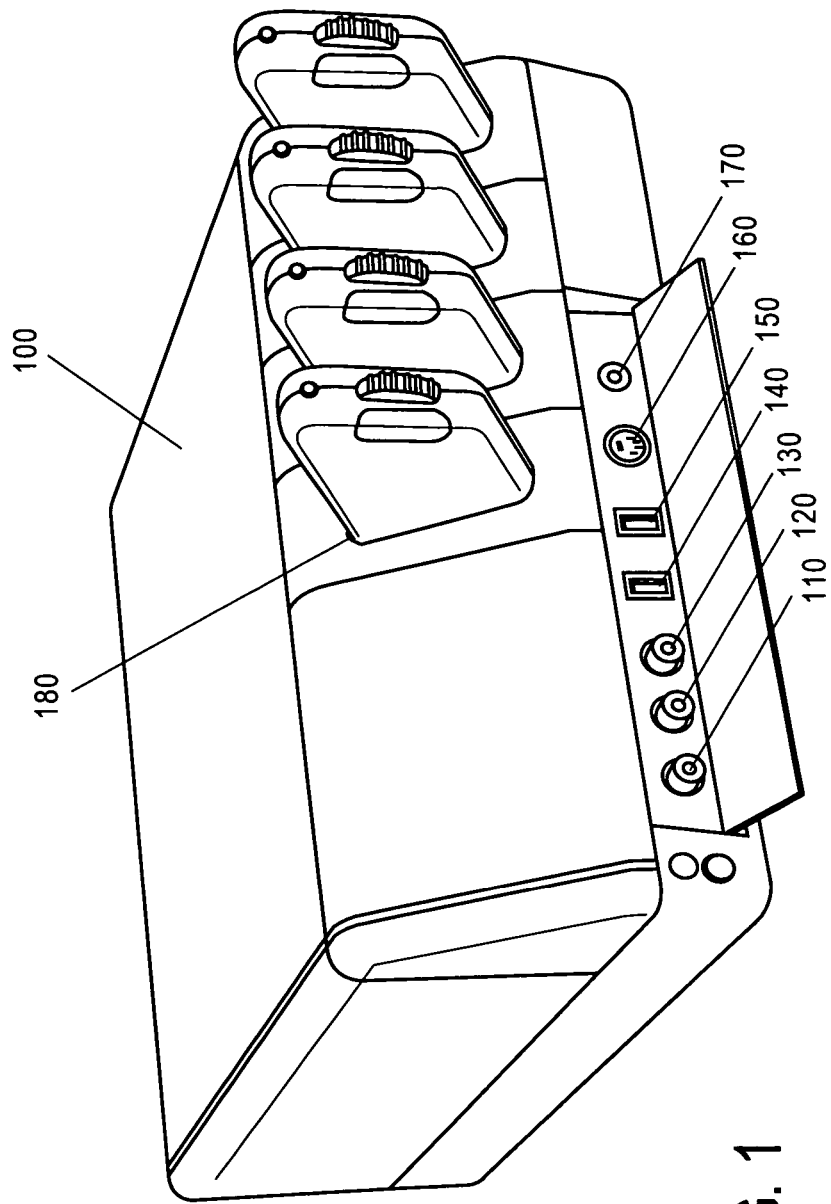
FIG. 1 is a front view of a digital archive, referred to as a "Nest," in accordance with an embodiment of the present invention.

NEST—a host device connected to a cable or satellite or Internet network, and including a library of digital songs that can be copied to Eggs, such as the host device illustrated in FIG. 1.

TRY & BUY—a limited right to play a song that is not owned until an expiration occurs, at which time the song may be purchased for ownership.

DETAILED DESCRIPTION

Digital music players are proliferating as standalone consumer electronic devices, such as MP3 players, as bundled components within portable devices such as personal data assistants (PDAs) and cell-phones, and as home network appliances. Listeners typically build up their own personal libraries of digital songs, which are stored on memory units such as hard disk drives and removable memory cards. Digital songs are typically acquired through the Internet via subscription services and a la carte purchases, via peer-to-peer exchanges, or by converting songs from a compact disc (CD) and importing them into an MP3 library. Acquiring digital music files may infringe copyrights, unless the files are validly obtained through a service that pays royalties to the copyright holders.

Digital songs typically include audio data and auxiliary data, referred to as meta-data, used to index the songs within the listener's library. For example, within MP3 files meta-data is accessed through an ID3Tag; WMA files embed meta-data within the files, and both file types can embed meta-data within the filenames themselves. By indexing the songs, a listener can inspect his library, search his library to access individual songs therein, remove songs, and create playlists. Typically audio players provide a user interface through which users view meta-data.

Barring copyright issues, building up a digital music library requires a lot of time and work. Typically, a listener first searches the Internet for one or more songs of interest, then identifies locations of the songs, and then downloads them into a database associated with a media player. Songs are typically stored as digital files, formatted in compliance with a standard format, such as MP3 or WMA. Once the songs are downloaded, the listener typically uses software such as Windows Media Player or Winamp to play the songs on a computer, or alternatively he copies the songs onto a hardware device, such as an iPod™ or MP3 player, that plays the songs.

A shortcoming in the world of digital music is the great effort required to build custom music libraries at home. Often individuals spend nights on end downloading their favorite songs and building their own personal music libraries. An alternative is to purchase libraries that have been prepared by others, but often someone else's library does not match another listener's taste and the listener prefers to collect his own favorite songs.

A popular source for a listener to hear his favorite songs is on music stations. Cable, satellite broadcast and the Internet provide music channels for almost every genre of music—classical music, rock and roll, jazz, music of the 80's, etc. A listener can enjoy music according to his taste by subscribing to such broadcast services.

Embodiments of the present invention enable a listener to automatically copy and import songs that are broadcast from a music station into his digital music library, along with the songs' meta-data required for indexing his library. Using an embodiment of the present invention a listener, with practically no effort, can automatically build up a large digital music library with tens of thousands of his choice of songs, all properly indexed for search and retrieval. Moreover, an additional feature of embodiments of the present invention enables the listener to select which songs from among those broadcast on the music stations are to be imported into his library, based on one or more of criteria including inter alia genre, song title, artist, album and length of song.

Copying songs that are broadcast from a music station is akin to copying television programs onto a VCR. Copyright law permits a consumer to copy television programs broadcast to his home onto his VCR. The technology for automatically copying songs, however, is more complex since raw audio recording from a music station does not provide the meta-data necessary to identify such songs and incorporate them into a digital music library. Moreover, each song has to be separated out from other songs, since songs are played sequentially with overlapping on the music station, generally without breaks in between.

Embodiments of the present invention concern a method and system for automatically building digital music libraries, from music channels broadcast through cable and satellite stations. In an embodiment of the present invention, broadcast songs are recorded into a digital music library, along with meta-data necessary for indexing and accessing each individual song, and for display while the songs are being played. Using embodiments of the present invention, the digital music library generated from the broadcast music serves as a large library of individual songs, with full search and access capability.

Embodiments of the present invention provide a system that enables a listener to automatically digitally record broadcast songs into a digital music library, and automatically index each recorded song according to genre, song title, artist and album title, as described hereinbelow. Additionally, embodiments of the present invention enable the listener to filter songs to be automatically recorded, by specifying inter alia a genre, song tile or artist, instead of recording all of the broadcast songs. The listener need not be present while the system of the present invention is in operation. It may thus be appreciated that embodiments of the present invention enable automatic generation of large libraries of songs.

Embodiments of the present invention use a programmable device, referred to herein as a "Nest," that can interface with computers, with MP3 players and other digital music players, and with other electronic devices that include MP3 players or other digital music players therewithin, including inter alia cell phones, PDAs, home network appliances and Internet appliances. In a first embodiment, the Nest is coupled to a satellite/cable receiver; in a second embodiment, the Nest is coupled to a television; in a third embodiment, the Nest is coupled to various. external components via a USB and a Firewire connection.

In all embodiments, the memory storing the digital music library can be either a large hard disk situated within the Nest itself, or one or more smaller removable memory units such as compact disks and memory cards, or a combination of hard disk and removable memory. The advantage of a large hard disk is that the listener's music library is consolidated into a single library that can be searched and accessed in its entirety. The advantage of removable memory units, such as compact disks, is that the listener can insert the disks into portable players such as MP3 players. Assuming that 40 songs on average require 128 MB of data and include one and a half hour's worth of listening, a large 80 GB hard disk can hold a library of approximately 25,600 songs; and a 640 MB compact disk can hold approximately 200 songs, or about 7½ hours worth of listening.

Reference is now made to FIG. 1, which is a front view of a Nest 100, in accordance with an embodiment of the present invention. Nest 100 is shown with its front panel open. On the left side of the front panel are female left and right analog audio-in connectors 110 and 120, and female analog video-in connector 130, preferably used for connecting auxiliary audio and video devices, such as a CD player, in order to add content into the Nest. On the right side of the front panel are female USB sockets 140 and 150, preferably used for connecting foreign MP3 players to the Nest; a female Ethernet connector 160, preferably for connecting the Nest to a computer network; and a mini-jack socket 170, preferably used to provide analog stereo audio-out for headphones.

In an embodiment of the present invention, a Nest includes one or more exchange ports 180, also referred to herein as "cradles," through which one or more hand-held digital music players, referred to herein as "Eggs," can be connected to the Nest, for loading songs from a digital music library stored on the Nest thereto. Such exchange ports may be circular or oval ports into which Eggs are inserted. Thus it may be appreciated that Eggs may be "charged up" with songs while they are plugged into the cradles of the Nest.

Reference is now made to FIG. 2, which is a side view of an Egg 200, in accordance with an embodiment of the present invention. Egg 200 is shown with a panel 210 that displays meta-data for a song currently being played. As can be seen in FIG. 2, the meta-data includes a title ("Blowing in the Wind"), an author ("Bob Dylan") and an album ("Bob Dylan's Greatest Hits").

Reference is now made to FIG. 3, which is a bottom view of the Egg 200 of FIG. 2, in accordance with an embodiment of the present invention. The bottom of the Egg includes a female audio/video connector 310, preferably for transferring analog audio and analog video between the Egg and a Nest; and a female USB connector 320, preferably for transferring digital data between the Egg and a Nest, between the Egg and a "filling station" kiosk, and between the Egg and another Egg. Corresponding to connectors 310 and 320, the cradles of the Nest contain male analog audio/video connectors and male USB connectors (not shown in FIG. 1).

A typical usage scenario for a Nest and Egg is as follows. A listener sets his cable or satellite receiver box to a specific music channel, preferably from a commercial-free radio station, such as The Music Choice®, and activates the Nest to capture songs from the music channel. The Nest automatically creates a digital music library and imports the broadcast songs therein. Thereafter, the listener plugs an Egg into a cradle of the Nest, and downloads selected songs from the music library onto the Egg. If the Nest is connected to the listener's speaker system, then the listener may also pipe music from the Nest into speakers in various rooms. If the Nest is connected to a home network, the listener may stream audio to a computer that is authorized to work with the Nest.

In addition to a Nest being able to download songs to the Egg when the Egg is connected to the Nest, the Nest is also able to remove songs stored in the Egg. Thus, if the Egg storage is full, the Nest can remove songs from the Egg, in order for the Egg to download a new set of songs.

Eggs of embodiments of the present invention may receive digital music from other sources, in addition to the Nest. Thus the Eggs may be compatible with kiosks, such as music kiosks located in music distribution stores, used for listening to songs prior to purchase and for subsequent purchase. For one embodiment, when an Egg is connected to a Nest, the digital music received from other devices and stored within the Egg can be archived on the Nest.

It may further be appreciated that an Egg may receive control commands through its USB connector. Specifically,
  when connected to a Nest, the Nest may issue control commands to the Egg, such as a command to advance to the next song; and
  when connected to a docking station, such as a docking station for the Egg in a room of a house, the docking station may receive infra red commands issued by a user, and translate them into control commands to the Egg over the USB connector.

Figure 4:
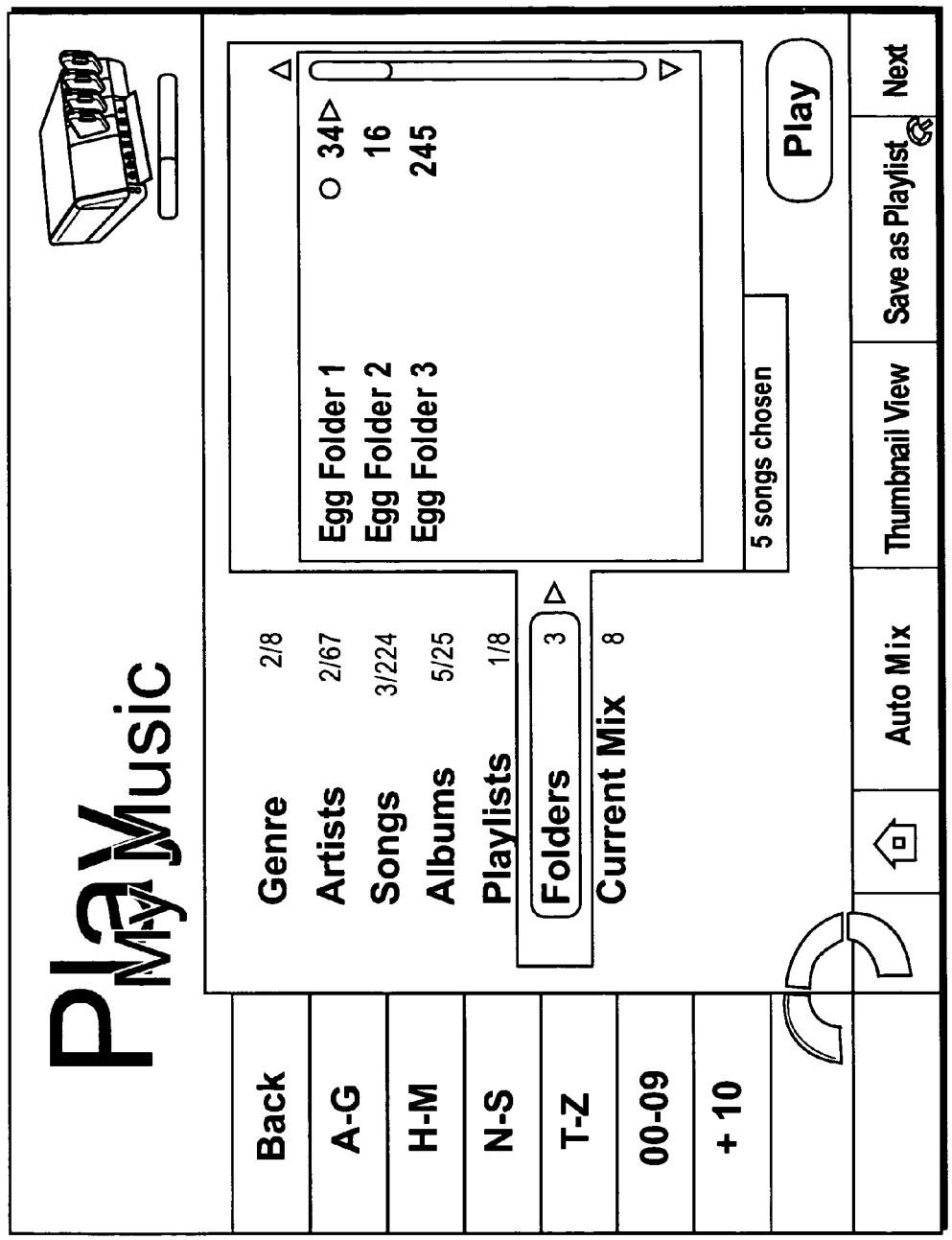
FIG. 4 is an illustration of a user interface for copying songs from the digital archive of FIG. 1 into the music player of FIG. 2, in accordance with an embodiment of the present invention.

Reference is now made to FIG. 4, which is an illustration of a graphical user interface (GUI) for copying songs from the Nest of FIG. 1 into the Egg of FIG. 2, in accordance with an embodiment of the present invention. The GUI shown in FIG. 4 is preferably displayed on a television or other display device connected to the Nest, and interacted with through use of a remote control device, such as an infra-red control unit. As such, the GUI of FIG. 4 is intended for navigation with simple directional buttons and a select button.

The GUI shown in FIG. 4 is used to organize a digital music library and create playlists; i.e., sequences of songs for playing from the Nest, or for copying to an Egg for playback from the Egg.

Figure 5:
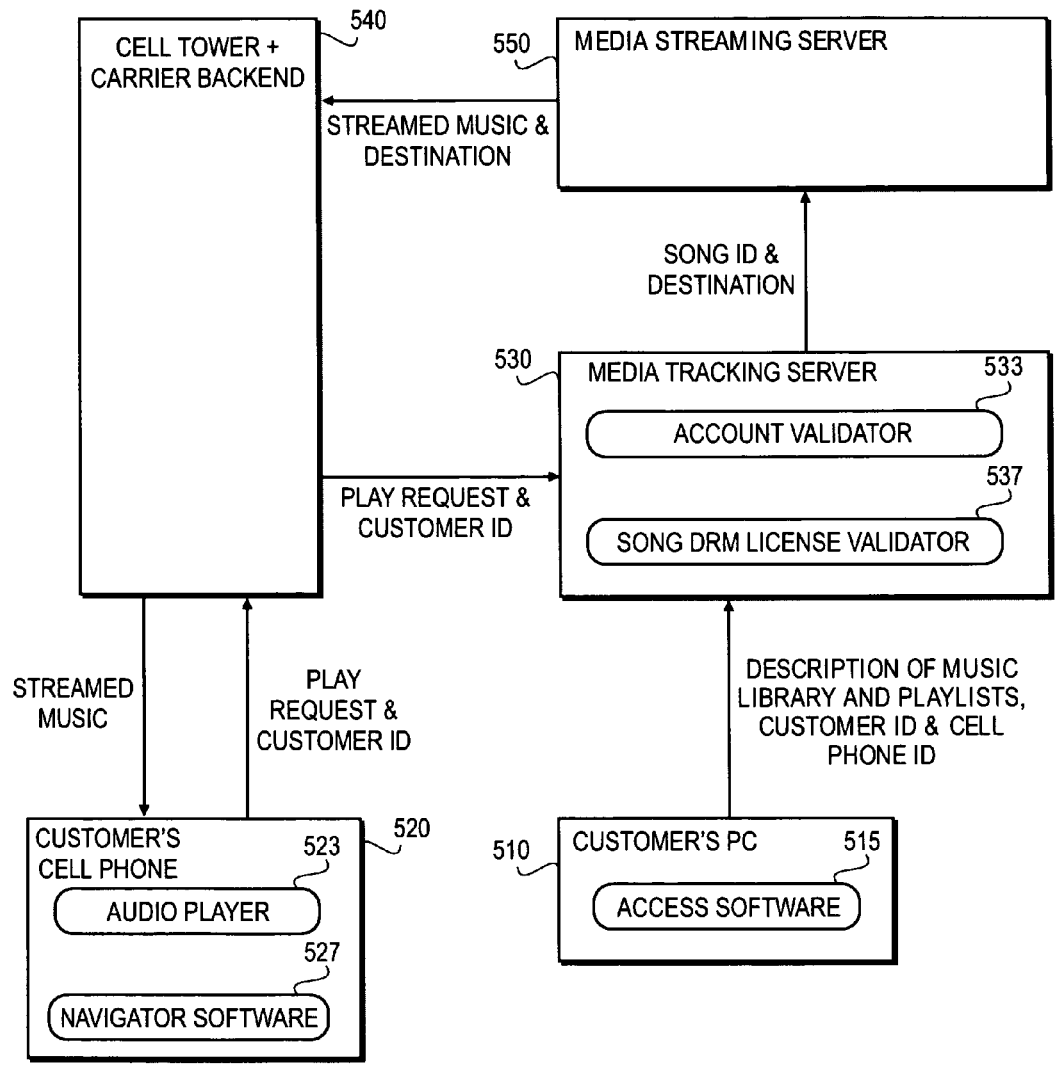
FIG. 5 is a simplified block diagram of a tracking system used to stream a customer's music to the customer's cell phone, in accordance with an embodiment of the present invention.

Embodiments of the present invention enable a customer to listen to music on his Nest, from sources other than the Nest itself, including inter alia the Nest's associated Eggs, and the customer's cell phone that has an embedded audio player. In this regard, reference is now made to FIG. 5, which is a simplified block diagram of a tracking system used to stream a customer's music to the customer's cell phone, in accordance with an embodiment of the present invention. Shown in FIG. 5 is a customer PC, 510, which includes a library of the customer's music files, and meta-data describing the music files and the customer's playlists. The customer uses the present invention to register his PC 510 and his cell phone, 520, with a media tracking server 530. Cell phone 520 includes an embedded digital audio player 523, through which the customer can listen to music. Specifically, PC 510 transmits customer information to media tracking server 530, including inter alia (i) customer name, (ii) customer cell phone 520 handset type, cell provider and phone number, and (iii) PC 510 ID. Additionally, a customer may register his entire household, and submit a household name along with multiple customer names, cell phones and PC IDs.

Access software 515 installed on PC 510 then scans PC 510 to generate a list of IDs of songs resident on PC 510. Access software 515 also scans PC 510 for player databases, such as iTunes databases, Windows Media Player databases, Napster databases and other such player databases. Access software 515 also scans PC 510 for podcasts that the customer subscribes to and Internet radio station preferences. With each song ID, access software 515 also generates a song status, including inter alia digital rights management data for the song, and time constraints for the song.

Access software 515 identifies those of the customer's songs that are eligible for tracking, and verifies that the digital rights managed songs have valid licenses. For a song that access software 515 does not recognize, access software sends a snippet of the song to a song database, such as a Gracenote database, which identifies the song from its snippet.

Access software 515 transmits the customer's song information to media tracking server 530, which registers the customer, the customer's cell phone, and the customer's song information in its data store. Access software 515 may additionally transmit the songs themselves to media tracking server 530. In such case, media tracking server 530 maintains a copy of the user's songs, or further transmits the songs to media streaming server 550, or both. Media tracking server 530 or media steaming server 550, or both, thus act as a remote backup of the user's songs.

Also shown in FIG. 5 is a media streaming server 550, which contains a large database archive of audio files, including audio files for the songs referenced in media tracking server 530.

Subsequent to registration, the customer can use navigation software 527 on his cell phone 520 to access his songs. Specifically, the customer issues a play request from cell phone 520, which is transmitted to a cell tower 540.

Cell tower 540 is used in FIG. 5 to represent both a cell tower and a carrier back end. Generally a cell tower forwards requests it receives to a cell carrier backend, and the carrier back end forwards them on. More generally, cell phone 520 and cell tower 540 may operate with any wireless network, including inter alia cellular networks and wi-max networks.

Cell tower 540 forwards the request to media tracking server 530, which validates the customer's account, using an account validator 533. If the customer's account is validated, media tracking server 530 returns meta-data describing the customer's song collections and playlists to cell tower 540. Specifically, media tracking server 530 returns inter alia ID's of the customer's songs, each song with corresponding meta-data including name, album, artist and genre; and the customer's playlists, each playlist with corresponding meta-data including names and song IDs.

Cell tower 540 forwards the meta-data to cell phone software 527, which enables the customer to use the keypad of his cell phone to navigate his collections of songs and playlists, and to select a desired song for listening. An ID for the song selected by the customer is sent from cell phone 520 to cell tower 540, and forwarded to media tracking server 530. Media tracking server 530 verifies that the customer's digital rights management license for the selected song is currently valid, using a song DRM license validator 537. If the license for the selected song is currently valid, then media tracking server 530 sends an instruction to media streaming server 550 designating the song to be streamed and the cell phone destination.

In response, media streaming server 550 streams the song to cell tower 540, which in turn forwards the song to cell phone audio player 523 for the customer's listening enjoyment. If a remote backup of the user's songs is maintained on media tracking server 530, as described hereinabove, then the remote backup copy of the user's selected song is streamed from media tracking server 530 to cell tower 540, which in turn forwards the song to cell phone audio player 523.

Media tracking server 530 logs tracking information indicating that the designated customer is listening to the designated song, within a tracking history. Music streams may be cached on the customer's cell phone 520, as appropriate, for subsequent access.

Figure 6:
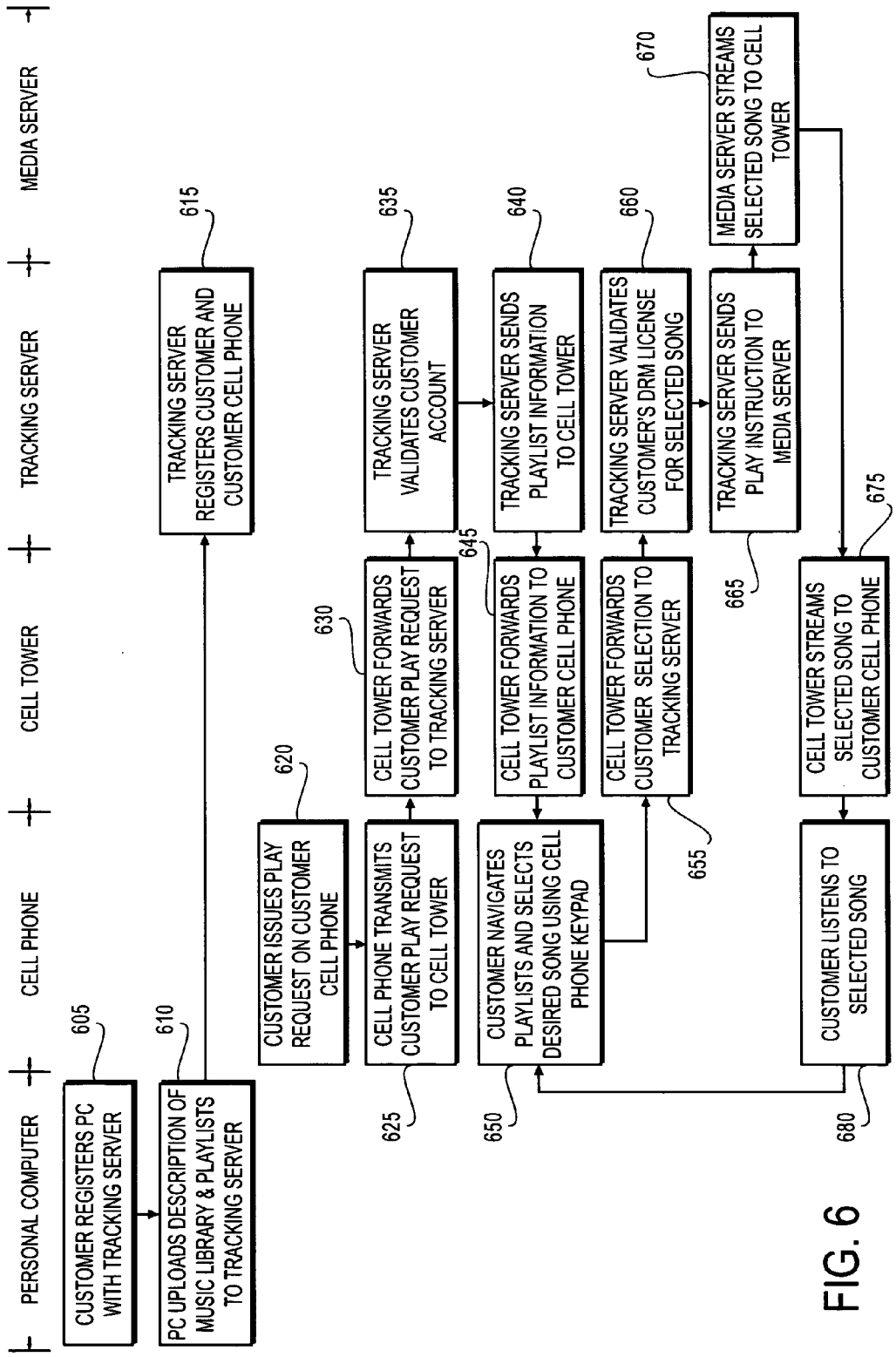
FIG. 6 is a simplified flowchart of a method for streaming a customer's music to the customer's cell phone, in accordance with an embodiment of the present invention.

Reference is now made to FIG. 6, which is a simplified flowchart of a method for streaming a customer's music to the customer's cell phone, in accordance with an embodiment of the present invention. The flowchart of FIG. 6 is divided into five columns. The first column on the left indicates operations performed by a customer's personal computer, such as PC 510 (FIG. 5) running access software 515. The second column indicates operations performed by the customer's cell phone, such as cell phone 520 that includes an embedded audio player 523 and navigator software 527. The third column indicates operations performed by a cell tower and a carrier backend, such as cell tower and carrier backend 540. The fourth column indicates operations performed by a tracking server, such as media tracking server 530. The fifth column indicates operations performed by a media server, such as media streaming server 580.

FIG. 6 includes two stages; namely, a first stage for registering a customer's PC with the tracking system, which begins at operation 605, and a second stage for enabling a customer to play his songs on his cell phone, which begins at operation 620.

At operation 605 the customer's PC registers itself with the tracking server. Access software running on the PC scans the PC and generates a list of song IDs and playlists into which the customer has organized his songs. At operation 610 the PC uploads the list of the customer's songs and his playlists to the tracking server, together with information identifying the customer and the customer's cell phone. The PC may additionally upload the customer's songs themselves to the tracking server, as described hereinabove. At operation 615 the tracking server registers the customer and the customer's cell phone, and stores the list of the customer's songs and his playlists in its data store. At this stage the PC has been registered with the tracking system, and the customer is then able to listen to his songs on his cell phone.

At operation 620 the customer issues a play request on his cell phone. At operation 625 the cell phone transmits the play request to the cell tower, using a wireless transmission protocol, such as GPRS/3G. At operation 630 the cell tower receives the play request and forwards it to the tracking server, via the wireless protocol. At operation 635 the tracking server receives the play request and validates the customer's account. If the customer account is successfully validated, then at operation 640 the tracking server sends the customer's song collections and playlist information to the cell tower, via the wireless protocol. Otherwise, the tracking server denies the customer's play request. At operation 645 the cell tower forwards the customer's song collections and playlist information to the cell phone, via the wireless protocol.

Alternatively, the customer's playlist information may be cached in the customer's cell phone, thereby obviating the need to perform operations 630-645. Such cached playlist information is periodically refreshed to ensure that it accurately reflects the content and licenses on the customer's PC. The refresh operation may be performed with or without user intervention.

At operation 650 the customer uses the keypad of his cell phone to navigate his playlists and select a desired song for listening. The user's selection is then transmitted to the cell tower, via the wireless protocol.

At operation 655 the cell tower receives the user's song selection, which it then forwards to the tracking server. At operation 660 the tracking server validates the customer's digital rights management license for the selected song, to ensure that the user has the necessary license to play the song. The tracking server may have the customer's license stored therein for examination, or else query the customer's PC to determine validity of the customer's license. In the latter case, the tracking server denies the customer's play request if the customer's PC is not connected.

If the customer's license for the selected song is valid, then at operation 665 the tracking server sends instructions to the media server to stream the selected song to the customer's cell phone. Otherwise, the tracking server denies the customer's play request. The tracking server may also log the event that the designated customer is listening to the selected song, within a tracking history.

At operation 670 the media server receives the instruction from the tracking server, and initiates streaming of the selected song to the cell tower. At operations 675 and 680, the cell tower receives the streamed data, and forwards it to the customer's cell phone for his listening enjoyment. After the song finishes playing the customer may return to operation 650 and select another song.

It will be appreciated by those skilled in the art operation 660 ensures that the cell phone access enabled by the present invention does not enable a customer to circumvent digital rights management license restrictions.

Copyright Management

In accordance with an embodiment of the present invention, an Egg is registered with at most one Nest, and only Eggs registered with a Nest have the right to check-out non-promotional songs therefrom, as described hereinbelow. Typically, a Nest will have multiple Eggs registered with the Nest.

In accordance with an embodiment of the present invention, a song within a Nest or an Egg is labeled as "Purchased", "Recorded" or "Try & Buy". A "Purchased" song is one that is paid for by a consumer. Purchased songs include inter alia songs purchased through an Internet service such as iTunes® or Napster®, songs purchased through a kiosk, and songs copied and converted ("ripped") to a format such as MP3 from a CD that is purchased. "Recorded" songs include songs recorded for a consumer from a cable or satellite music station. "Try & Buy" songs are promotional or trial versions of songs that are provided to a consumer for free, and eventually expire. If the consumer wishes to continue to listen to such songs, he must obtain a Purchased or Recorded version of the song.

Expiration of a Try & Buy song may occur inter alia after a fixed time period, such as thirty days, or after a fixed number of playbacks of the song. Upon expiration, a Try & Buy song may cease to play altogether, or may play only a down-sampled version of the song or a header of the song, or may instead play a message explaining how to purchase the song, or otherwise enable purchase of the song.

Preferably, the label of a Try & Buy song includes a URL or other such identifier for one or more web sites that serve as a clearinghouse through which the song can be purchased.

In accordance with an embodiment of the present invention, the Nest includes a list of songs that are already contained within the Nest and an auxiliary list of songs that are not already contained within the Nest. For example, whenever a song from a specific album by a specific artist is contained within the Nest, the auxiliary list includes other songs from the same album or other songs by the same artist. Songs that have been recorded within the Nest are labeled as Recorded. Other songs, not contained within the Nest, can preferably be downloaded to the Nest as trial Try & Buy versions, upon request by a consumer. After listening to a Try & Buy version of a song, the consumer may purchase the song using the Nest, and the purchased song is then labeled as Purchased. Such labeling of a song as Recorded, Purchased or Try & Buy serves to identify the copyrights associated with the song.

Preferably, when a song is copied from one device to another device where the two devices are registered with one another, such as from a Nest to an Egg that is registered with the Nest, or from an Egg to a Nest that the Egg is registered with, the label of the song is maintained; i.e., the label of the song on the target device is set to the label of the song on the source device. For example, if a Try & Buy song is copied from a Nest to an Egg that is registered with the Nest, and then to another Egg that is also registered with the same Nest, then the song is labeled as Try & Buy on the two Eggs. Similarly, if an Egg is used to purchase a song from a kiosk and the song is subsequently copied to a Nest that the Egg is registered with, then the song is labeled as Purchased on the Egg and on the Nest.

In an embodiment of the present invention, when a song is copied from one device to another device where the two devices are not registered with one another, such as from a Nest to an Egg or from an Egg to a Nest, where the Egg is not registered with the Nest, then regardless of the label of the song on the source device, the song is labeled as Try & Buy on the target device.

TABLE I

Copyright Label of Song on Target Device

| Source Device --> Target Device | Source Label --> Target Label |
|---|---|
| Nest --> Egg registered with the Nest OR Egg registered with Nest --> Nest OR Egg --> Egg, both Eggs registered with the same Nest | Purchased --> Purchased Recorded --> Recorded Try & Buy --> Try & Buy |
| Nest --> Egg not registered with the Nest OR Egg not registered with Nest --> Nest OR Egg --> Egg, Eggs registered with the different Nests | Purchased --> Try & Buy Recorded --> Try & Buy Try & Buy --> Try & Buy |
| Cable/satellite broadcast --> Nest CD or other recording media (optical, magnetic, etc.) --> Nest | --> Recorded |
| CD or other recording media (optical, magnetic, etc.) --> Egg Internet music service (iTunes ®, Napster ®) --> Nest Music kiosk --> Egg | --> Purchased |

The logic of TABLE I assumes that any two devices can determine whether or not they are commonly registered. This capability can be achieved, for example, if the registration information is built into a Nest and an Egg at the time of manufacture.

In addition to the logic of TABLE I, the label of a song within a Nest or an Egg is changed from Try & Buy to Purchased if a user purchases the song from a clearinghouse, using the Nest or the Egg, respectively.

In an alternative embodiment of the present invention, the Nest can directly determine whether an Egg is registered with it, but an Egg cannot directly determine whether it is registered with a Nest, or whether it and another Egg are registered to the same Nest. This occurs, for example, if an Egg has the capability of registering itself with any one of a plurality of Nests after it is manufactured. In this latter case, the logic of TABLE I is modified so that whenever a song is copied from a source Egg to a target Egg, the song is labeled as Try & Buy in the target Egg. Accordingly, the copyright labeling of a song on a target device follows TABLE II.

TABLE II

Copyright Label of Song on Target Device (Alternate)

| Source Device --> Target Device | Source Label --> Target Label |
|---|---|
| Nest --> Egg registered with the Nest OR Egg registered with Nest --> Nest | Purchased --> Purchased Recorded --> Recorded Try & Buy --> Try & Buy |
| Nest --> Egg not registered with the Nest OR Egg not registered with Nest --> Nest OR Egg --> Egg | Purchased --> Try & Buy Recorded --> Try & Buy Try & Buy --> Try & Buy |
| Cable/satellite broadcast --> Nest | --> Recorded |
| CD or other recording media (optical, magnetic, etc.) --> Nest | |
| CD or other recording media (optical, magnetic, etc.) --> Egg | --> Purchased |
| Internet music service (iTunes ®, Napster ®) --> Nest | |
| Music kiosk --> Egg | |

In this alternative embodiment, an Egg that is registered with a first Nest may be re-registered with a second Nest. In such case, the Egg is no longer registered with the first Nest. Preferably, there is a limit to the number of times an Egg can be re-registered, and after an Egg re-registers itself a maximum number of times, it is blocked from further re-registration.

In a second alternative embodiment of the present invention, the distinction between Purchased and Recorded songs is ignored, and both are identified as "Owned" songs. In this second alternative embodiment, the copyright labeling of a song on a target device follows TABLE III.

TABLE III

Copyright Label of Song on Target Device (Second Alternate)

| Source Device --> Target Device | Source Label --> Target Label |
|---|---|
| Nest --> Egg registered with the Nest OR Egg registered with Nest --> Nest OR Egg --> Egg, both Eggs registered with the same Nest | Owned --> Owned Try & Buy --> Try & Buy |
| Nest --> Egg not registered with the Nest OR Egg not registered with Nest --> Nest OR Egg --> Egg, Eggs registered with the different Nests | Owned --> Try & Buy Try & Buy --> Try & Buy |
| Cable / satellite broadcast --> Nest | --> Owned |
| CD or other recording media (optical, magnetic, etc.) --> Nest | |
| CD or other recording media (optical, magnetic, etc.) --> Egg | --> Owned |
| Internet music service (iTunes ®, Napster ®) --> Nest | |
| Music kiosk --> Egg | |

In yet a third alternative embodiment of the present invention, copying of songs from a Nest to multiple Eggs, each of which is registered with the Nest, is restricted. This third alternative embodiment has a more elaborate logic than the preferred and first and second alternative embodiments. In order to best describe this logic, the terms "checking-out" and "checking-in" of songs are used as follows. When an Egg is connected to a Nest in order to download songs from the Nest to the Egg, this is referred to herein as "checking-out" of songs. When an Egg is connected to a Nest in order to remove songs stored in the Egg, this is referred to herein as "checking-in" of songs.

Often the same song can be broadcast multiple times from a cable or satellite music station, while the Nest is operational to record the broadcast songs. For one embodiment of the present invention, the Nest stores a count for each Recorded song, which is incremented when the Nest encounters a broadcast song that has already been recorded onto the Nest archive. Such count thus corresponds to the total number of times the Recorded song has been broadcast while the Nest was recording, and is denoted henceforth as max_permitted_copies. For example, if a Recorded song is re-played five times on the Music Channel while the Nest is recording from the Music Channel, then max_permitted_copies=5 for such song.

The max_permitted_copies count for a Recorded song is used to restrict the number of different Eggs that the Nest allows to check-out the song. For example, if max_permitted_copies=5 for a Recorded song, then at most five different Eggs can check-out the song from the Nest. That is, for each Recorded song in its archive, the Nest stores a count for each song, which is incremented when an Egg checks-out the song. Such count corresponds to the number of Eggs that have checked-out the song, and is denoted henceforth as number_copies_checked_out. For example, if three Eggs have checked-out the same Recorded song from the Nest, then number_copies_checked_out=3 for such song.

In accordance with an embodiment of the present invention, when an Egg checks-in a Recorded song with the Nest, thereby removing the song from the Egg, the number_copies_checked_out count is decremented. For example, if number_copies_checked_out=3 for a Recorded song and an Egg that checked-out the song subsequently checks-in the song, then number_copies_checked_out is decremented to 2 for such song.

Figure 7:
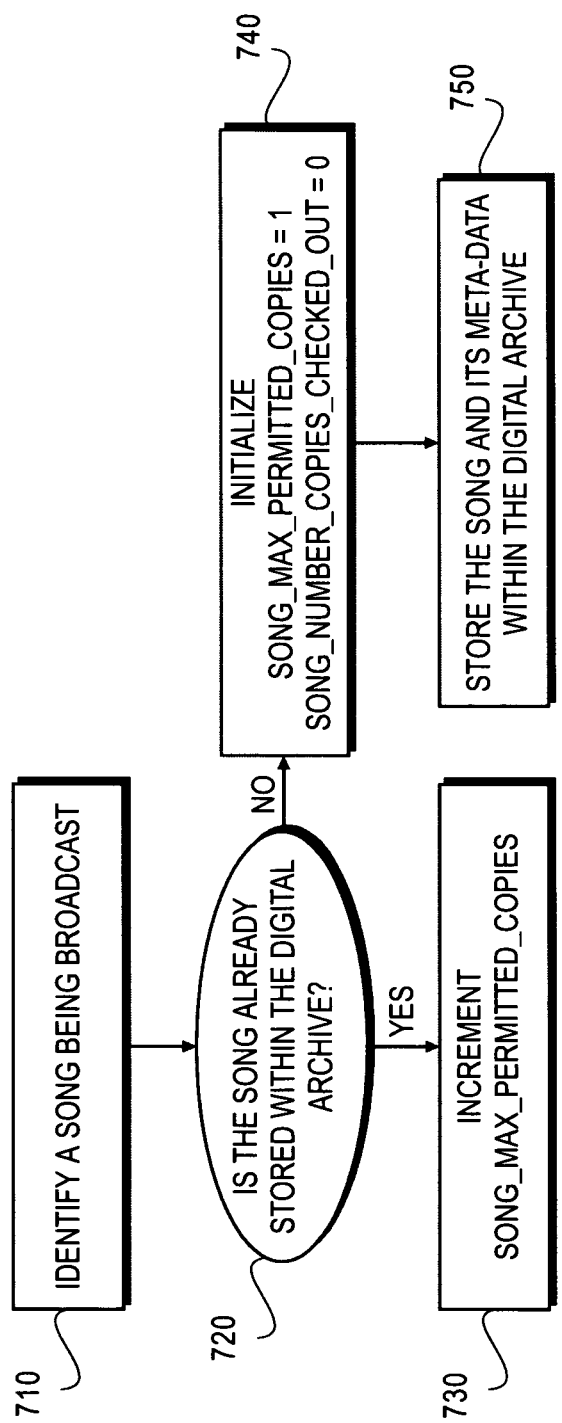
FIG. 7 is a simplified flowchart of a method for "checking-out" songs from the digital archive of FIG. 1 to the music player of FIG. 2, in accordance with an embodiment of the present invention.

Reference is now made to FIG. 7 which is a simplified flowchart of a method for tracking the number of times the same song is broadcast while the Nest 100 of FIG. 1 is recording music, in accordance with an embodiment of the present invention. At operation 710 the Nest identifies a song being broadcast from a cable or satellite station that is currently being recorded by the Nest. At operation 720 the Nest determines whether or not the song is already stored within the Nest's digital archive. If so, then at operation 730 the Nest increments max_permitted_copies by one. Otherwise, at operation 740 the Nest initializes max_permitted_copies=1 for the song, and number_copies_checked_out=0 for the song. At operation 750 the Nest stores the Recorded song and its meta-data within the Nest's digital archive.

Figure 8:
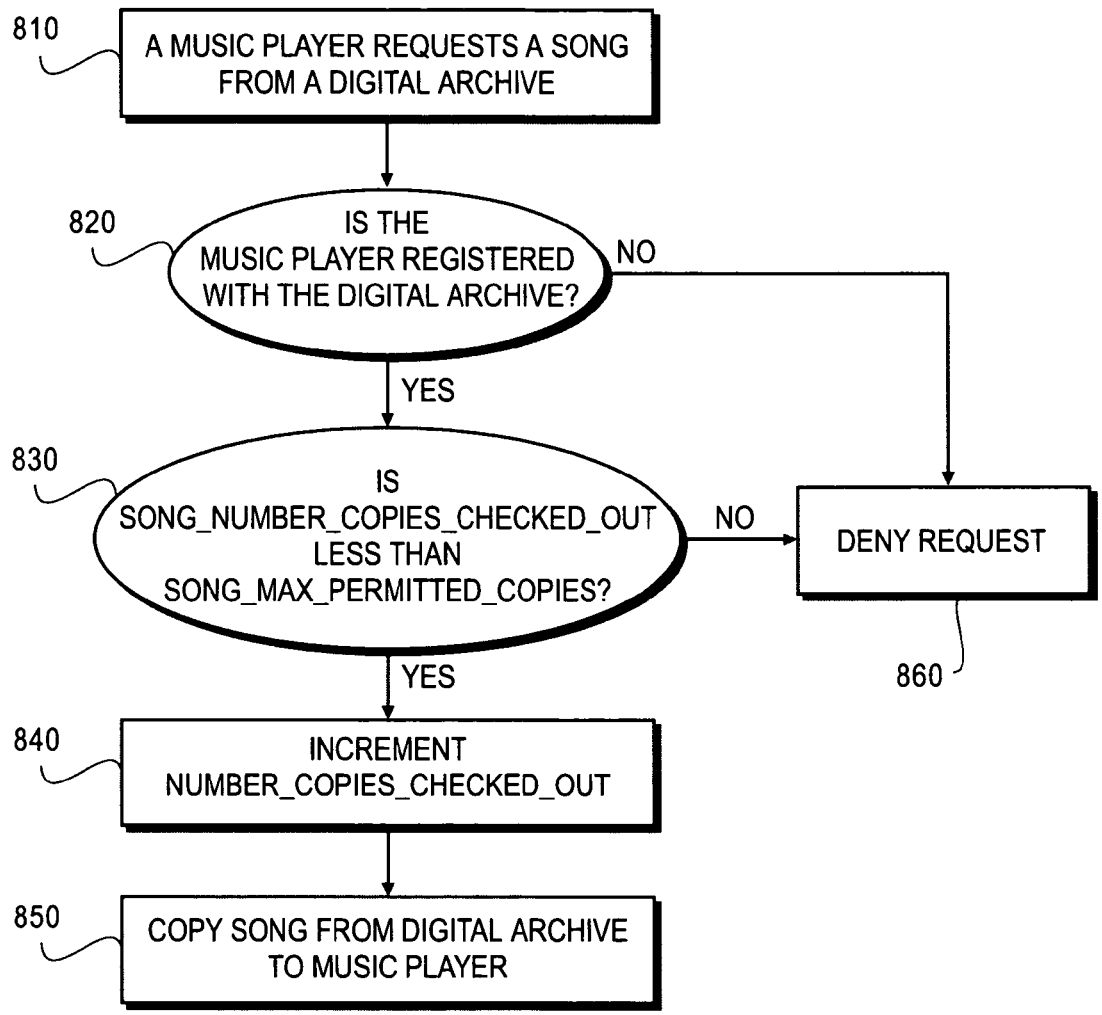
FIG. 8 is a simplified flowchart of a method for "checking-in" songs from the music player of FIG. 2 to the digital archive of FIG. 1, in accordance with an embodiment of the present invention.

Reference is now made to FIG. 8, which is a simplified flowchart of a method for "checking-out" Recorded songs from the Nest of FIG. 1 to the Egg of FIG. 2, in accordance with an embodiment of the present invention. At operation 810 an Egg that is connected to a cradle in a Nest requests to copy a Recorded song from the Nest to the Egg. At operation 820 the Nest determines whether or not the Egg is registered with the Nest. If so, then at operation 830 the Nest determines whether number_copies_checked_out is less than max_permitted_copies for the requested song. If so, then at operation 840 the Nest increments number_copies_checked_out for the song by one, and at operation 850 the Nest permits the Egg to copy the song from the Nest to the Egg.

If, at operation 820 the Nest determines that the Egg is not registered with the Nest, or if, at operation 830, the Nest determines that number_copies_checked_out is equal to max_permitted_copies, then the Egg's request for the Recorded song is denied at operation 860. Alternatively, the Recorded song may be copied onto the Egg as a trial version, and labeled Try & Buy.

Figure 9:
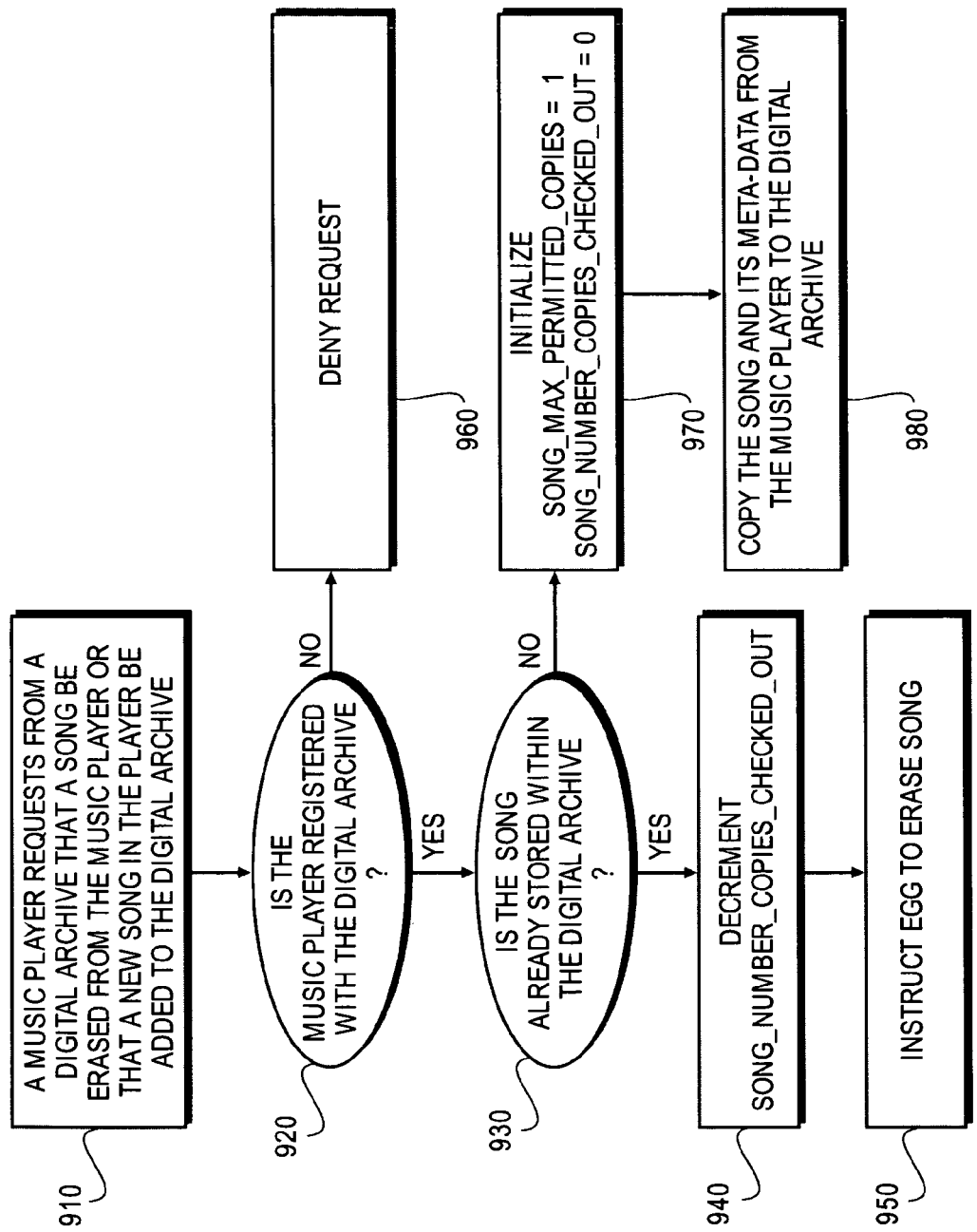
FIG. 9 is a simplified flowchart of a method for tracking the number of times the same song is broadcast while the digital archive of FIG. 1 is recording music, in accordance with an embodiment of the present invention.

Reference is now made to FIG. 9, which is a simplified flowchart of a method for "checking-in" songs from the Egg of FIG. 2 to the Nest of FIG. 1, in accordance with an embodiment of the present invention. If a song labeled Try & Buy is checked in from an Egg to a Nest, then the song is also labeled Try & Buy on the Nest.

If a song labeled Recorded is checked in from an Egg to a Nest, then at operation 910 an Egg connected to a cradle in the Nest requests to check-in the Recorded song. At operation 920 the Nest determines whether or not the Egg is registered with the Nest. If so, then at operation 930 the Nest determines whether or not the song already resides within the Nest's digital archive. If so, then at operation 940 the Nest decrements number_copies_checked_out for the song by one, and at operation 950 the Nest instructs the Egg to erase the song from the Egg.

If at operation 920 the Nest determines that the Egg is not registered with the Nest, than the Egg's request to check-in the song is denied at operation 960. Alternatively, the song may be copied onto the Nest as a trial version, and labeled Try & Buy. If at operation 930 the Nest determines that the song does not currently reside within its digital archive, then this indicates that the Egg obtained the song from another source, such as from a kiosk. As such, at operation 970 the Nest initializes max_permitted_copies=1 for the song, and number_copies_checked_out=0 for the song. At operation 980 the Nest copies the song and its meta-data from the Egg into the Nest's digital archive.

When a Recorded song is copied from a first Egg to a second Egg in this embodiment, the song is labeled as Try & Buy on the second Egg, even if the first and second Egg are both registered to the same Nest.

Purchased songs may also be restricted for copying to multiple Eggs with similar logic, by setting max_permitted_copies=1.

In general, it may now be appreciated by those skilled in the art that the present invention supports a general digital rights configuration, by means of rules that specify whether or not a song residing on a source device has requisite permission for copying to a target device and, if so, how the song should be labeled when copied to the target device. Such rules may be embodied within functions mayBeCopied(srcDeviceType, trgtDeviceType, isRegistered, srcDeviceLabel), trgtLabel(srcDeviceType, trgtDeviceType, isRegistered, srcLabel), where srcDeviceType and trgtDeviceType are device specific parameters:

srcDeviceType indicates the type of the source device in which the digital song resides, including inter alia Nest and Egg; and trgtDeviceType indicates the type of the target device onto which the digital song is to be copied, including inter alia Nest and Egg;

where isRegistered is specific to a pair of devices:

isRegistered indicates whether or not the source device and target device are commonly registered;

where srcLabel and trgtLabel are both song and device specific parameters:

srcLabel indicates the label of the song on the source device, including inter alia Recorded, Purchased and Try & Buy or, alternatively, Owned and Try & Buy; and trgtLabel indicates the label of the song on the target device, including inter alia Recorded, Purchased and Try & Buy or, alternatively, Owned and Try & Buy; and where:

mayBeCopied indicates whether or not the song may be copied from the source device to the target device.

More generally, as described hereinabove, the functions mayBeCopied( ) and trgtLabel( ) may have additional parameters max_permitted_copies and number_copies_checked_out, where max_permitted_copies and number_copies_checked_out are both song and device specific parameters:

max_permitted_copies indicates the maximum number of copies of the song that are permitted from the device; and number_copies_checked_out indicates the current number of copies of the song that have been made from the device.

It may be appreciated by those skilled in the art that alternatively the functions mayBeCopied ( ) and trgtLabel ( ) may be embodied as tables or other data structures.

Figure 10:
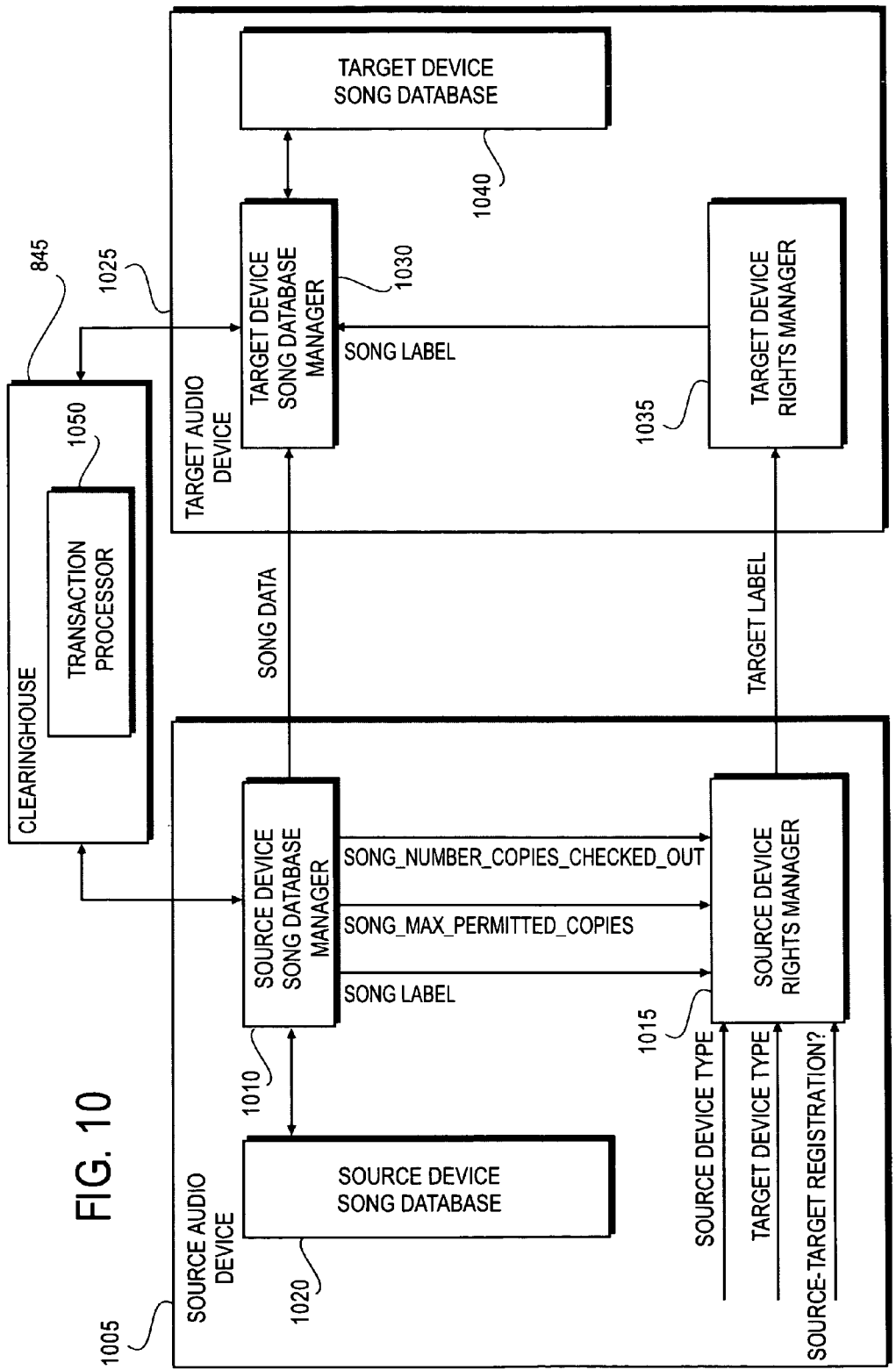
FIG. 10 is a simplified block diagram of a digital rights management system, in accordance with an embodiment of the present invention.

Reference is now made to FIG. 10, which is a simplified block diagram of a digital rights management system, in accordance with an embodiment of the present invention. Shown in FIG. 10 is a source device 1005 including a database manager 1010 and a rights manager 1015. Database manager 1010 preferably controls a database 1020 that stores digital songs and meta-data associated therewith. Preferably, the meta-data includes a label for each song, indicating whether the song is Purchased, Recorded or Try & Buy, as described hereinabove. Optionally, the meta-data may also include max_permitted_copies and number_copies_checked_out for one or more songs. The songs, their labels, and their max_permitted_copies and number_copies_checked_out parameters are accessible through database manager 1010.

It may be appreciated by those skilled in the art that digital songs and their meta-data may be stored in one or more database tables, within database 1020, that can be joined. Alternatively, the binary song data may be stored in memory locations outside of database 1020, and pointed to by address entries in database 1020. It may also be appreciated that database 1020 may instead be structured as a plurality of databases.

Also shown in FIG. 10 is a target device 1025, including its own database manager 1030, rights manager 1035 and database 1040.

Rights manager 1015 determines whether or not a song resident on source device 1010 may be copied to a specified target device, such as target device 1025. If copying of the song is permitted, then rights manager 1015 further determines a label to be used for the song on the target device, referred to as the target label. In accordance with an embodiment of the present invention, rights manager 1015 bases its determination on (i) the type of source device 1005, (ii) the type of target device 1025, (iii) the label of the song on source device 1005, and(iv) the max_permitted_copies and number_copies_checked_out parameters for the song on source device 1005. Rights manager 1015 preferably implements functions such as mayBeCopied( ) and trgtLabel( ) described hereinabove.

After rights manager 1015 determines the target label, it transmits the song and the target label to target device 1025.

Target device 1025 preferably adds the song to its database 1040 and labels the song in database 1040 according to the target label.

Also shown in FIG. 10 is a clearing house 1045, for purchasing songs. Source device 1005 and target device 1025 may purchase songs directly from clearing house 1045. For songs not currently resident on source device 1005 or target device 1025, clearing house 1045 sends the songs to the device that purchases them. For songs currently resident on source device 1005 or target device 1025 labeled Try & Buy, clearing house 1045 sends an authorization to source database manager 1010 or target database manager 1030 to change the label of the songs from Try & Buy to Purchased. Clearing house 1045 preferably includes a transaction processor 1050, which enables a user to purchase rights to songs and verifies the user's payment. Upon completion of a user's purchase of a song by transaction processor 1050, clearing house 1045 sends the songs to the user's device, or sends an authorization to the user's device to change the label of the song, as appropriate.

In accordance with an embodiment of the present invention, clearing house 1045 also freely distributes Try & Buy versions of songs, which can be converted to Purchased versions at a later date, if a user so desires.

For one embodiment, clearing house 1045 is administered by an entity that has distribution privileges for the songs it sells, such as a cable or satellite company.

Figure 11:
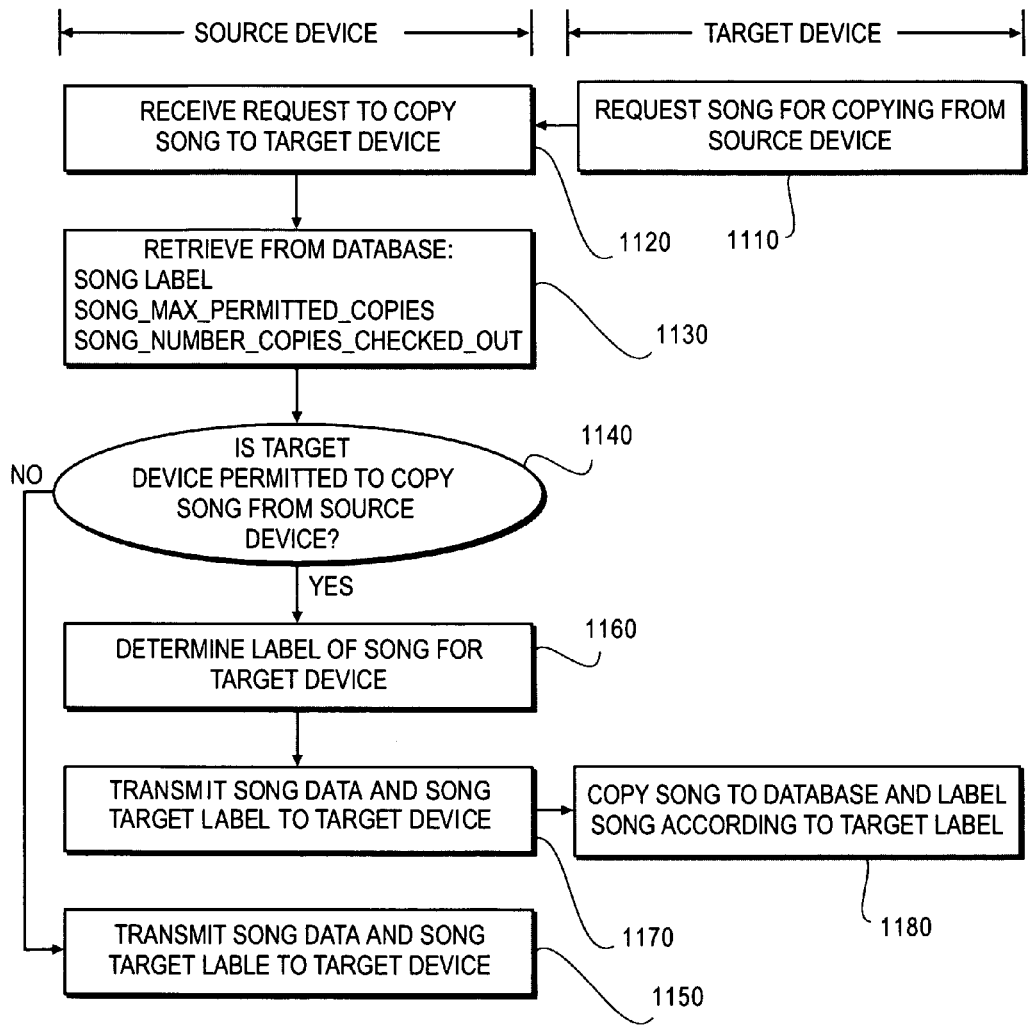
FIG. 11 is a simplified flow chart for a digital rights management method, in accordance with an embodiment of the present invention.

Reference is now made to FIG. 11, which is a simplified flow chart for a digital rights management method, in accordance with an embodiment of the present invention. As can be seen, FIG. 11 is divided into two columns, the leftmost column indicating operations performed by a source audio device, such as source device 1005 (FIG. 10) and the rightmost column indicating operations performed by a target audio device, such as target device 1025.

At operation 1110 the target device requests a song to be copied from the source device. At operation 1120 the source device receives the request and identifies the target device. In particular, the source device determines the type of the target device, and whether or not the source and target device are registered with one another.

At operation 1130 the source device determines the label for the requested song, and the max_permitted_copies and number_copies_checked_out parameters for the requested song. Preferably, this information is contained within a source device database, such as database 1020 (FIG. 10). At operation 1140 the source device determines whether or not the target device has permission to copy the song. Preferably such determination is made by a rights manager within the source device, such as rights manager 1015. If it is determined at operation 1140 that the target device does not have permission to copy the song from the source device, then at operation 1150 the source device denies the copy request. Otherwise, if it is determined at operation 1140 that the target device does have permission to copy the song from the source device, then at operation 1160 the source device determines how to label the song within the target device. Preferably, such determination is also made by a rights manager, such as rights manager 1015.

At operation 1170 the source device transmits the requested song and its label to the target device, and at operation 1180 the target device copies the requested song to its database, and labels it accordingly.

In reading the above description, persons skilled in the art will realize that there are many apparent variations that can be applied to the methods and systems described. Thus, the configurable logic described hereinabove for songs and audio devices is applicable as well to movies and video devices, and to other types of media and media devices.

Transfer of songs from source devices to target devices, and from clearinghouses to devices, may be performed in batches of songs, such as entire albums, as well as for single songs. In addition, devices may be "hot-synched" to one another. For example, an Egg may be hot-synched to a Nest, using wired or wireless communication, so that the Nest is updated periodically with the songs in the Egg.

Figure 12A:
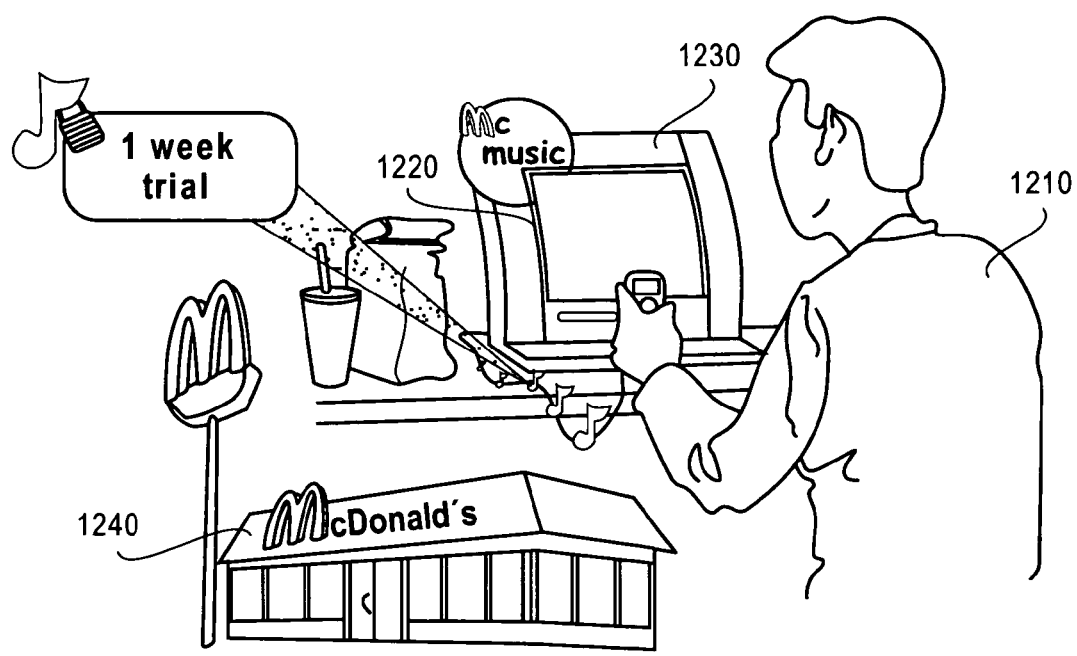

Reference is now made to FIGS. 12A and 12B, which are simplified illustrations of a first consumer use case of acquiring a song in accordance with an embodiment of the present invention. As shown in FIG. 12A, a consumer 1210 downloads a trial version of a song onto his Egg 1220 from a McMusic kiosk 1230 located within a McDonald's store 1240. The song is labeled Try & Buy, and consumer 1210 has limited rights to play the song for a one-week trial period. Subsequently, as shown in FIG. 12B, consumer 1210 decides to purchase the song for $1.00 from a clearinghouse via wireless communication. As a result of the purchase, the song is re-labeled as Purchased in Egg 1220, and consumer 1210 is granted full rights to the song.

Also shown in FIG. 12B is a pie chart 1250 illustrating how the $1.00 of revenue for the song is allocated between the content owner, the wireless provider, McDonald's and the owner of the present invention, as described hereinbelow.

Figure 13A:
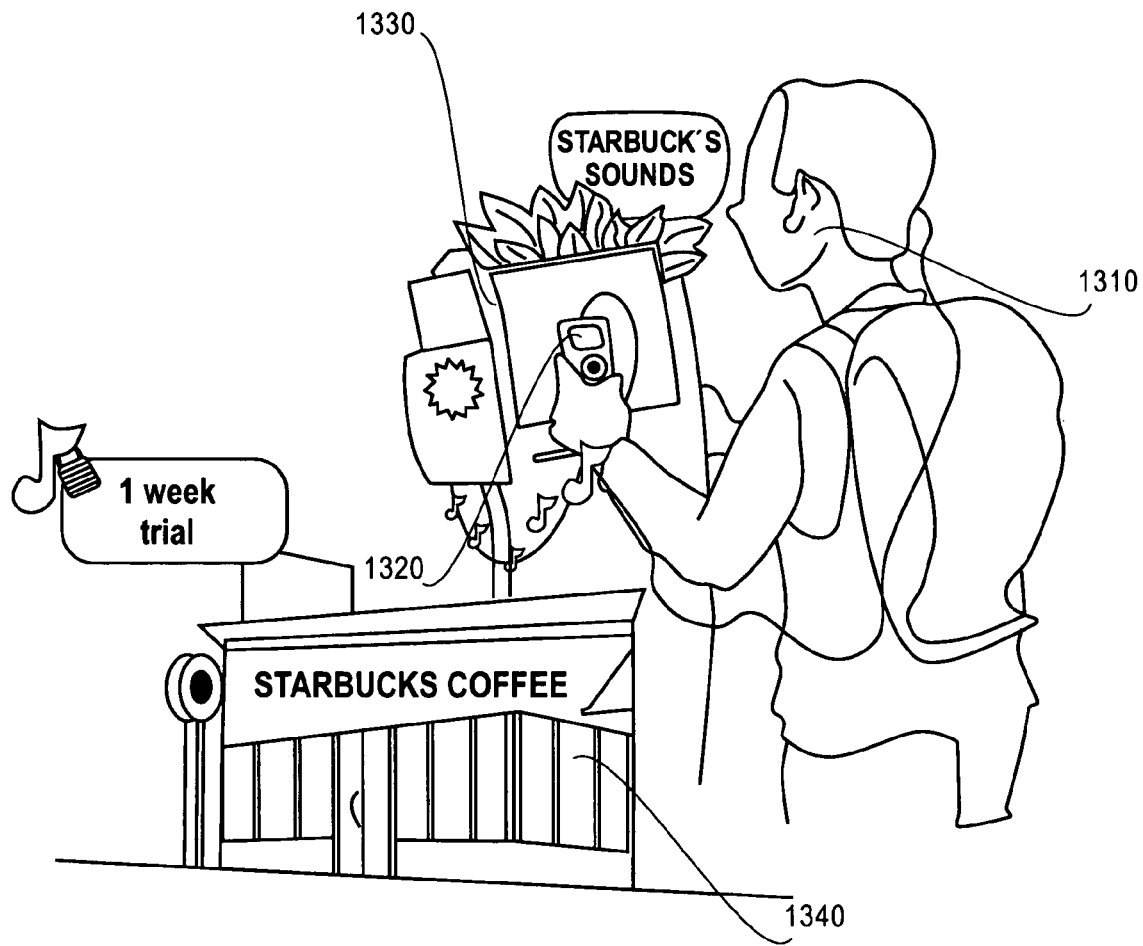
FIGS. 13A and 13B are simplified illustrations of a second consumer use case of acquiring a song in accordance with an embodiment of the present invention.
Figure 13B:
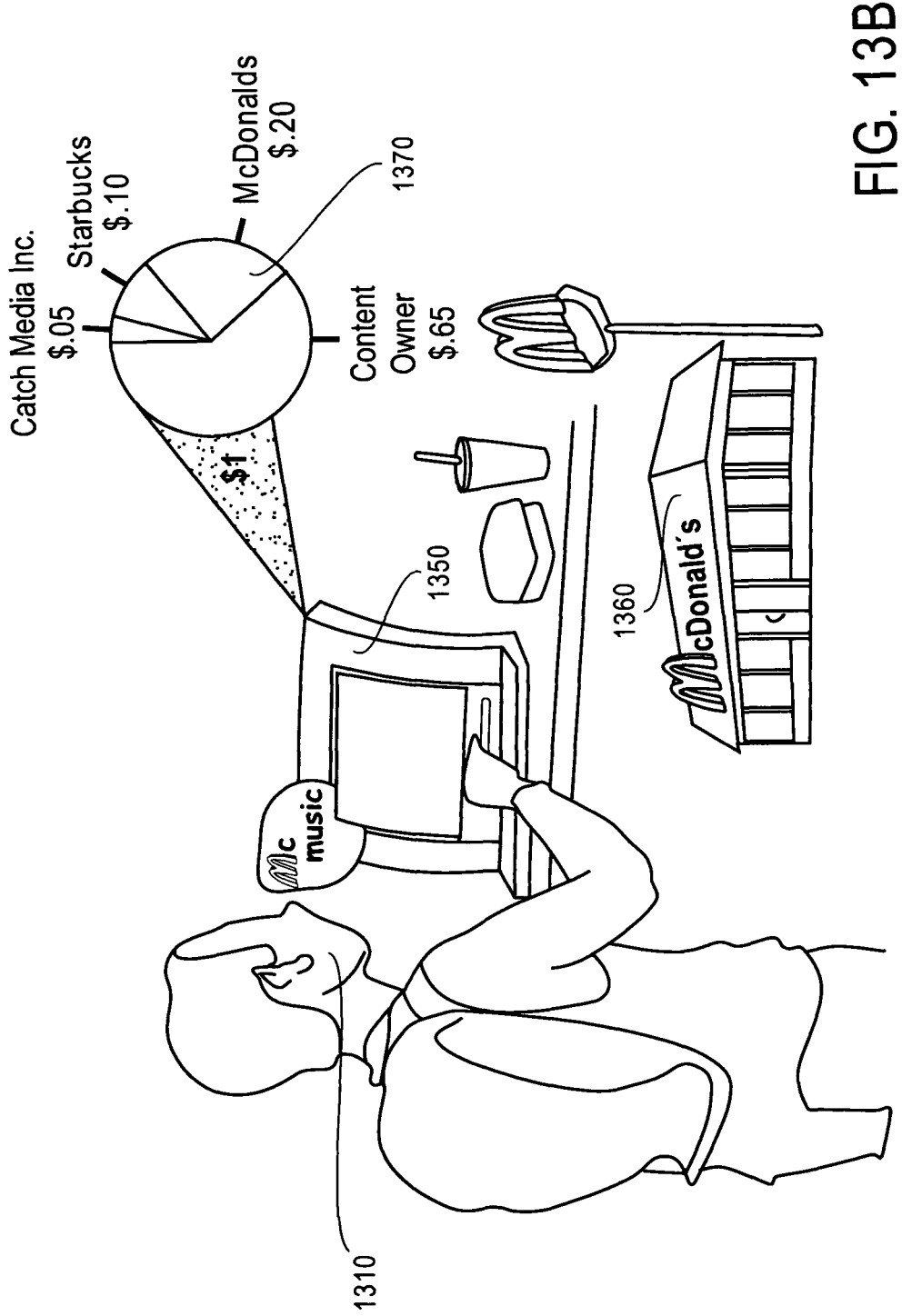

Reference is now made to FIGS. 13A and 13B, which are simplified illustrations of a second consumer use case of acquiring a song in accordance with an embodiment of the present invention. As shown in FIG. 13A, a consumer downloads a trial version of a song onto his Egg 1320 from a Starbuck's Sounds music kiosk 1330 located within a Starbuck's store 1340. The song is labeled Try & Buy, and consumer 1310 has limited rights to play the song for a one-week trial period. Subsequently, as shown in FIG. 13B, consumer 1310 decides to purchase the song for $1.00 from a McMusic kiosk 1350 located within a McDonald's store 1360. As a result of the purchase, the song is re-labeled as Purchased in Egg 1320, and consumer 1310 is granted full rights to the song.

Also shown in FIG. 13B is a pie chart 1370 illustrating how the $1.00 of revenue for the song is allocated between the content owner, Starbuck's, McDonald's and the owner of the present invention, as described hereinbelow.

Figure 14A:
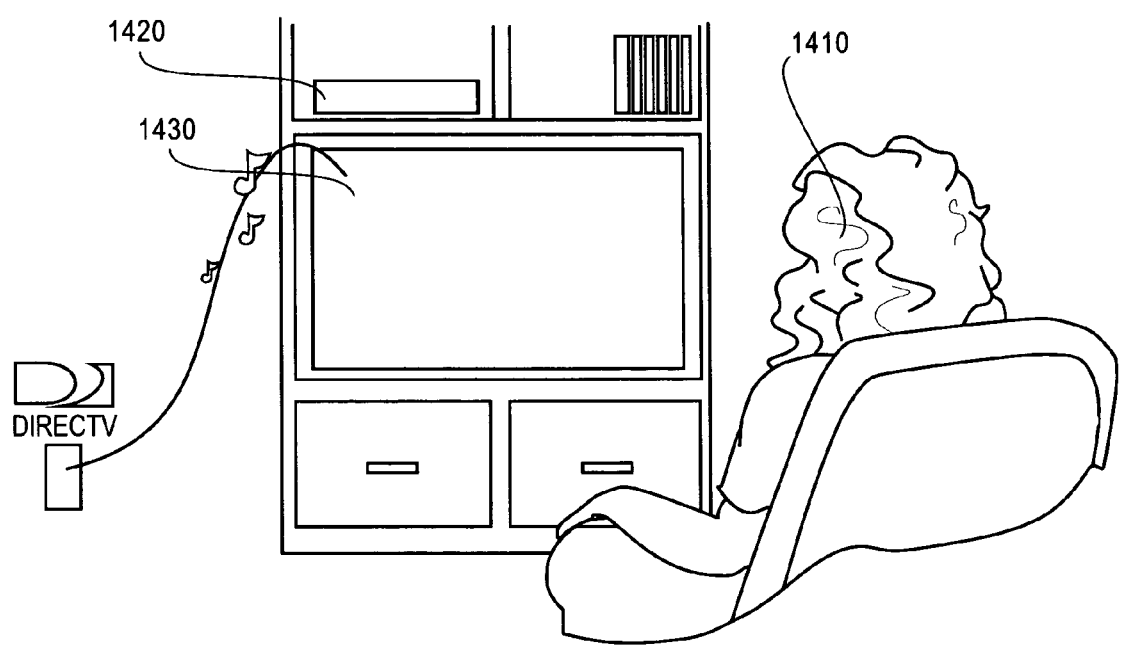
FIGS. 14A, 14B and 14C are simplified illustrations of a third consumer use case of acquiring a song in accordance with an embodiment of the present invention.
Figure 14B:
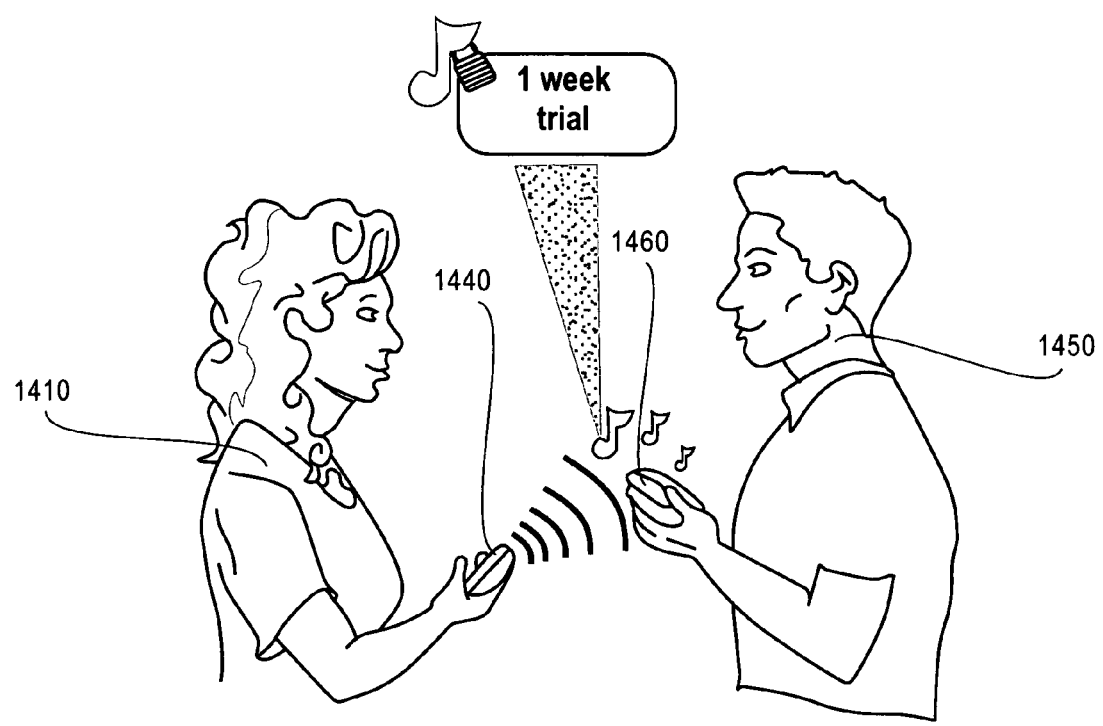
Figure 14C:
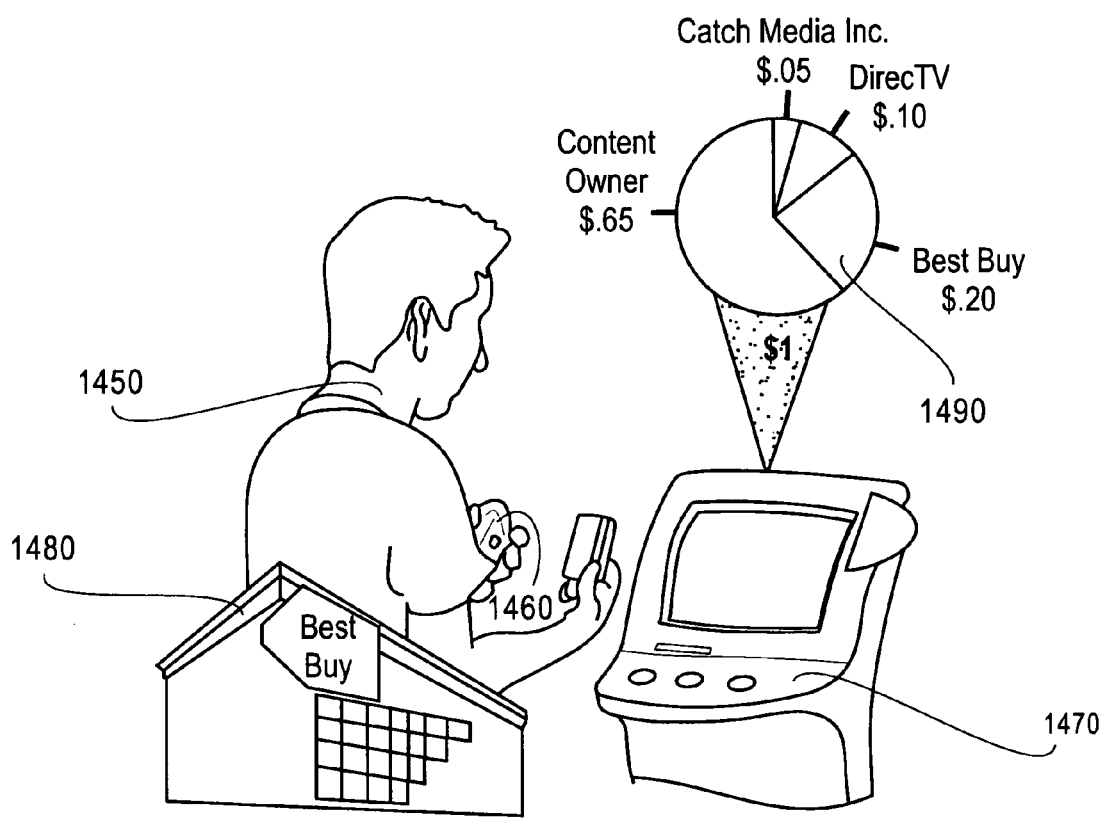

Reference is now made to FIGS. 14A, 14B and 14C, which are simplified illustrations of a third consumer use case of acquiring a song in accordance with an embodiment of the present invention. As shown in FIG. 14A, a consumer 1410 records a song from a DirectTV broadcast music station onto her Nest 1420, while enjoying home entertainment on her television 1430. The recorded song is labeled as Recorded, and consumer 1410 has corresponding rights to the song. Consumer 1410 copies the song from her Nest 1420 onto her Egg 1440.

Subsequently, as shown in FIG. 14B, consumer 1410 meets a friend, namely consumer 1450, who expresses interest in the song. Consumer 1410 then copies the song from her Egg 1440 onto his Egg 1460. Although the song is labeled as Recorded on Egg 1440, the song is labeled as Try & Buy on Egg 1460. As such consumer 1450 only has limited rights to play the song for a one week trial period.

Subsequently, as shown in FIG. 14C, consumer 1450 decides to purchase the song, which he does for $1.00 via a music kiosk 1470 located in a Best Buy store 1480. After purchasing the song, the song is re-labeled from Try & Buy to Purchased within Egg 1460, as a result of which consumer 1450 then has full rights to the song.

Also shown in FIG. 14C is a pie chart 1490, indicating allocation of the $1.00 purchase price for the song between the content owner, DirectTV, Best Buy and the owner of the present invention, as described hereinbelow.

Implementation of the Present Invention in Conjunction with Conventional Digital Rights Management Systems The digital rights management of the present invention can be implemented in conjunction with a third-party DRM method or system. Conventional DRM systems typically allow usage of music on a disconnected mobile device, but do not allow sharing from one disconnected device to another. With conventional DRM systems, if a disconnected mobile device receives music for which it does not have a valid license, it is not able to play the music, and will not be granted a license until it connects to a license server, usually by docking to a personal computer.

In distinction, using embodiments of the present invention music may be shared from a first consumer's Egg to a second consumer's Egg, and the second consumer is granted limited Try & Buy access to the music, with an option to purchase the music.

If a conventional DRM wrapper is removed from digital music, even if it is replaced with another DRM wrapper, then typically conventional players will not be able to play the music at all. As such, embodiments of the present invention preserve the conventional DRM wrapper, thus ensuring backward compatibility.

Figure 15:
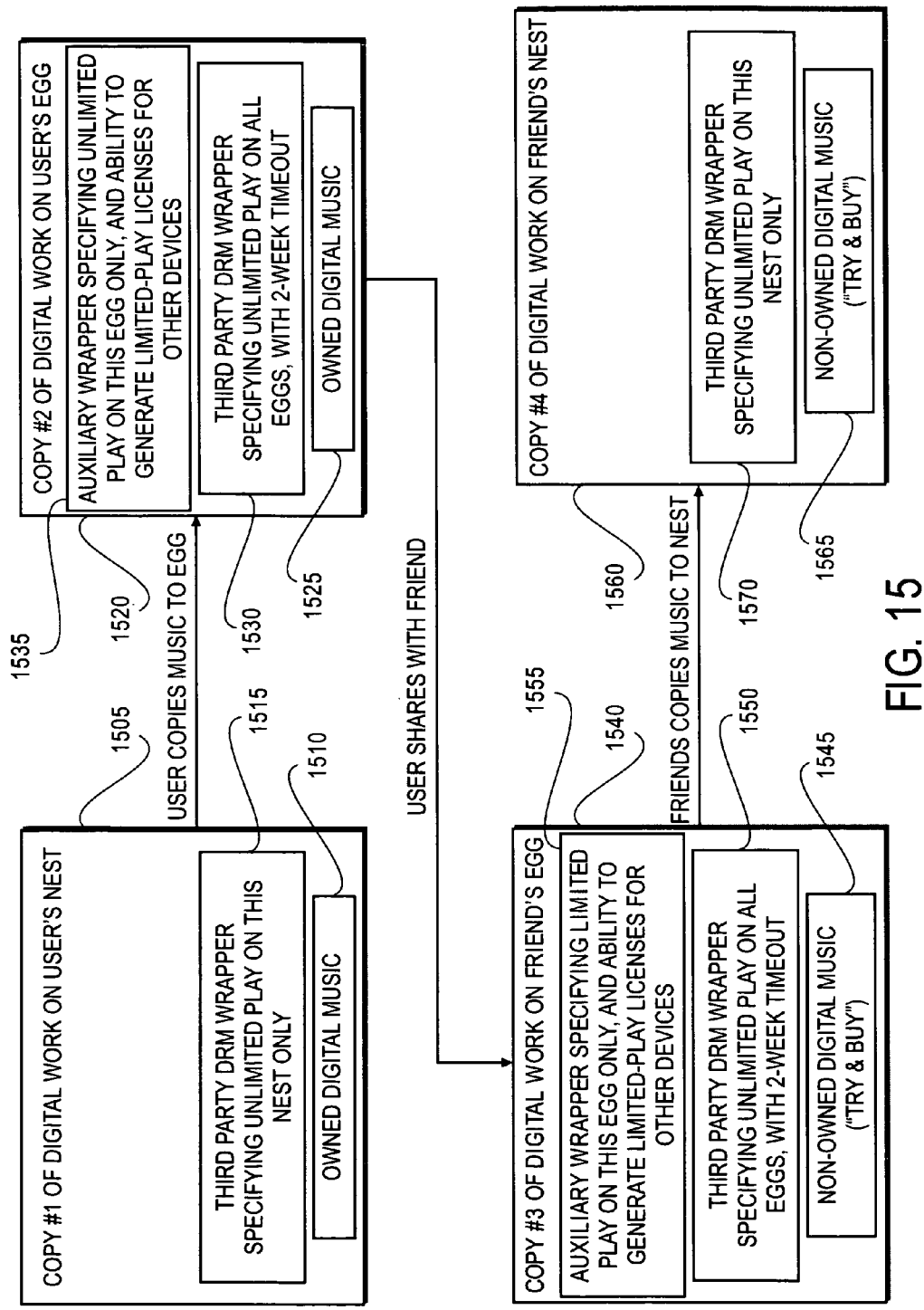
FIG. 15 is a simplified illustration of a workflow for implementing digital rights management in conjunction with a third-party DRM system, in accordance with an embodiment of the present invention.

Reference is now made to FIG. 15, which is a simplified illustration of a workflow for implementing digital rights management in conjunction with a third-party DRM system, in accordance with an embodiment of the present invention. Shown in FIG. 15 is a first copy 1505 of a digital work stored in a user's Nest. The copy includes a digital audio portion 1510, which has been licensed by the user, and a third-party DRM wrapper 1515 specifying unlimited play for the user's nest only.

When the user copies the digital work from his Nest (copy 1505) to his Egg, a second copy, 1520, of the digital work is created. The second copy 1520 includes a digital audio portion, 1525, preferably substantially similar to portion 1510, and a third-party DRM wrapper 1530. However, the third-party DRM wrapper has been modified so as to specify unlimited play on all eggs, with a prescribed timeout, such as a two-week timeout. In addition, an auxiliary DRM wrapper 1535 is added to the second copy, 1520, specifying unlimited play on the user's Egg, and the ability to generate limited play licenses for other devices.

When the user shares the digital work with his friend, a third copy, 1540, of the digital work is created as the digital work is copied from the user's Egg (copy 1520) to his friend's Egg (1540). The third copy 1540 includes a digital audio portion, 1545, preferably substantially similar to portion 1510, and a third-party DRM wrapper 1550 that is substantially identical to the third-party digital wrapper 1530 from the second copy 1520. The third copy 1540 also includes an auxiliary DRM wrapper 1555, but in distinction to DRM wrapper 1535, DRM wrapper 1555 specifies limited play on the friend's Egg, and the ability to generate limited play licenses for other devices.

When the friend copies the digital work from the friend's Egg (copy 1540) to the friend's Nest, a fourth copy, 1560, of the digital work is created. The fourth copy 1560 includes a digital audio portion, substantially similar to portion 1510, and a third-party DRM wrapper 1570 specifying limited play on the friend's Nest only. It will be noted that the auxiliary DRM layer is removed in copy 1560. As such, the music on the friend's Nest can be played by a conventional player.

It may be appreciated in FIG. 15 that the auxiliary DRM wrappers 1535 and 1555, instead of being stored within various copies of the digital work, may instead be stored in separate files associated within the copies of the digital work, or may alternatively be stored in a database table having a primary key that serves as an identifier for a copy of the digital work. Similarly, the conventional third-party DRM wrappers 1515, 1530, 1550 and 1570 may also be stored in separate files or within a database table.

Use of the Present Invention for Usage and Merchandising Tracking

As illustrated in FIGS. 12B, 13B and 14C, embodiments of the present invention has application to usage tracking for purposes of revenue sharing or aggregation of statistics. Licenses for digital music may be purchased through several channels, including inter alia (i) music recorded onto a Nest from broadcast, off-the-air;
(ii) music purchased through a Nest from a licensing authority; and
(iii) music purchased through an Egg from a music kiosk.

Music for preview, with a Try & Buy wrapper, may be licensed from these same channels.

Embodiments of the present invention are advantageous for tracking the following information for songs:

(a) if recorded, when it was recorded and from which provider;
(b) if purchased directly, the fulfiller of the purchase;
(c) if shared, the customer who originally owned the copy, the original fulfiller, and the sharing chain of users;
(d) play information for the current owner, whether played on the owner's Nest or the owner's Egg; and
(e) if upgraded from a Try & Buy version, the fulfiller of the original purchase by the original owner and the fulfiller of the purchase from the Try & Buy version.

Figure 16:
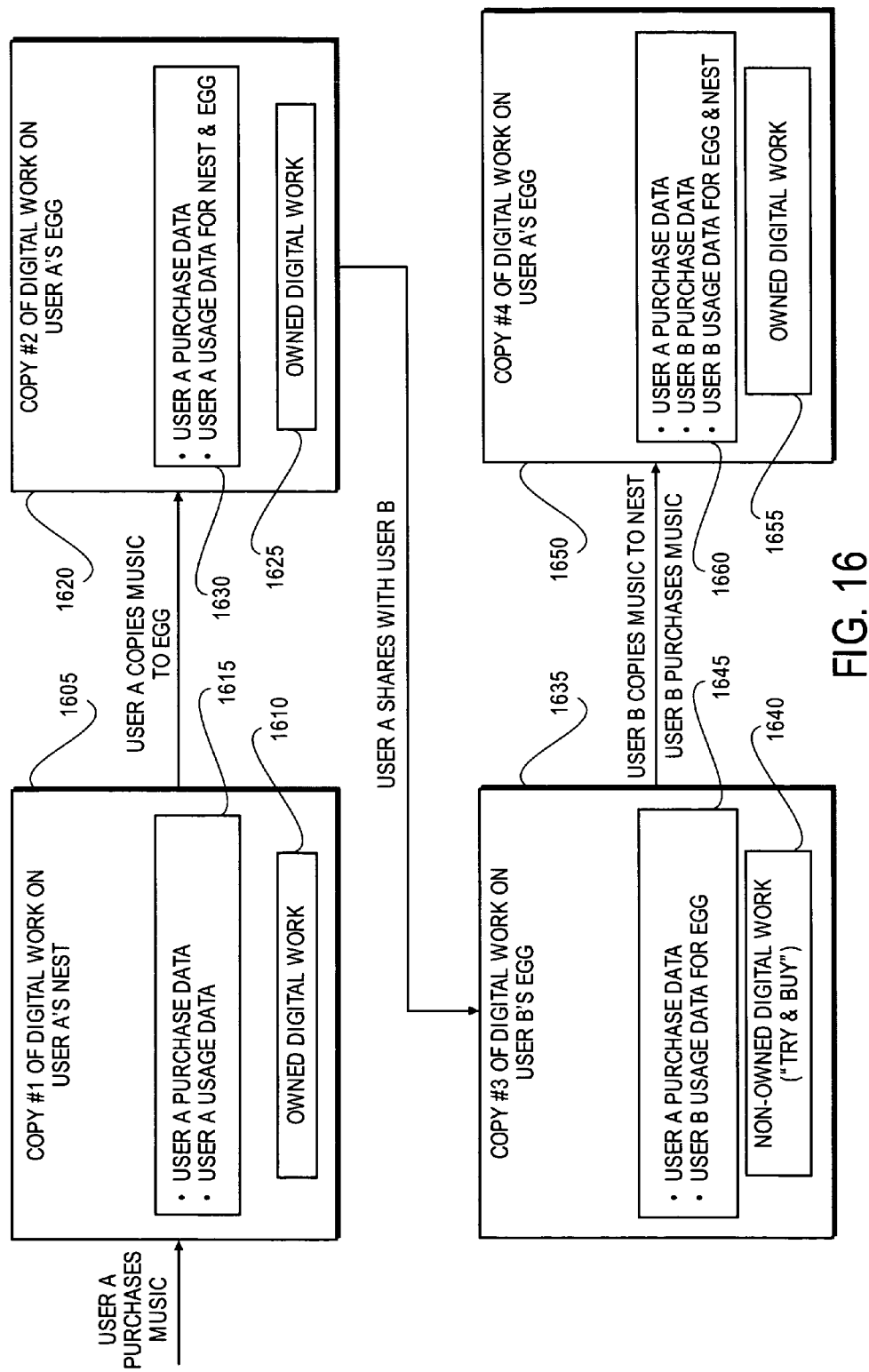
FIG. 16 is a simplified workflow for usage and merchandising tracking in accordance with an embodiment of the present invention.

Reference is now made to FIG. 16, which is a simplified workflow for usage and merchandising tracking in accordance with an embodiment of the present invention. Shown in FIG. 16 is a first copy, 1605, of a digital work that is purchased by user A, on user A's Nest. User A may have purchased the digital work, for example, over the Internet through a licensing authority, or on a CD at a retail store. Copy 1605 includes a digital audio portion, 1610, and a record, 1615, including user A's purchase information and user A's usage data on user A's Nest.

When user A copies the digital work from his Nest to his Egg, a second copy of the digital work, 1620, is created. Copy 1620 includes a digital audio portion, substantially similar to digital audio portion 1610, and a record, 1630, including user A's purchase information and user A's usage data on user A's Nest and user A's Egg.

When user A shares the digital work with user B, a third copy of the digital work, 1635, is created. Copy 1635 is a Try & Buy copy, since user B has not yet purchased a license for the digital work. Copy 1635 includes a digital audio portion, 1640, substantially similar to digital audio portion 1610, and a record, 1645, including user A's purchase information and user B's usage data on user B's Egg.

When user B copies the digital work from user B's Egg to user B's Nest, a fourth copy of the digital work, 1650, is created. Copy 1650 includes a digital audio portion, 1655, substantially similar to digital audio portion 1610, and a record, 1660. When user B subsequently purchases a license for the digital work, record 1660 is updated to reflect user A's purchase data, user B's purchase data and user B's usage data on user B's Egg and user B's Nest.

It may thus be appreciated that, for the purpose of merchandising, a portion of user B's purchase price may be paid to the fulfiller from which user A purchased the digital work. More generally, embodiments of the present invention can be used to track a purchase of a digital work along a sharing chain, back to an original fulfiller from which the digital work was purchased; and a portion of the purchase prices along the sharing chain can be allotted to the original fulfiller.

It may be appreciated in FIG. 16 that the records 1615, 1630, 1645 and 1660, instead of being stored within various copies of the digital work, may instead be stored in separate files associated within the copies of the digital work, or may alternatively be stored in a database table having a primary key that serves as an identifier for a copy of the digital work.

In accordance with an embodiment of the present invention, an application programming interface (API) for Eggs is provided, in order for third parties to use the tracking features of the present invention. Inter alia, the Egg API includes the following functions.

addSongPlayToHistory(trackID)
This function adds information to an Egg's internal song playback history, when a tracked song begins playing.

addSongShareToHistory(trackID)
This function adds information to an Egg's internal song sharing history, when a tracked song is shared from one device to another.

addSongSkipToHistory(trackID)
This function adds information to an Egg's internal song playback history, when a tracked song gets skipped while playing; i.e., when a user jumps to another song in the middle of playing the tracked song.

buildPlayerInventory( )
This function generates a list of tracked songs on an Egg, and is used generally when connecting the Egg to a kiosk or to a personal computer.

buildPlayerDockInventory( )
This function generates a list of tracked songs on a Nest, and is used generally when connecting an Egg to the Nest, so that the user does not purchase a song at a kiosk that he already has on his Nest at home.

songOwnedOnPlayer(trackID)
This function checks if trackID is currently owned on an Egg.

songOwnedOnDock(trackID)
This function checks if trackID is currently owned on a Nest.

buildSongPlayHistory(trackID)
This function builds a history of all times trackID has been played or skipped. The history is generally uploaded to a personal computer or to a kiosk, and then to a server computer for tracking use.

deleteSongPlayHistory(trackID)
This function clears an Egg's internal play history for trackID, and is generally called after the Egg's play history has been uploaded to a tracking server computer, in order that the same data is not uploaded twice.

storeContentLicense(trackID, contLicense)
This function stores the necessary licenses to played a digital rights managed song, in an Egg's protected data store. This function also associates the license with the song so that whenever the song is played, the license may be used to unlock it.

storeoriginationData(trackID, origData)
This function stores information in the Egg's internal memory, as to the origin of a song.

shareHistory buildSongShareHistory(trackID)
This function builds a share history object that holds a history of all times the designated track has been shared. The history is a trail of devices that the song has passed through prior to arriving at the current Egg. This function is generally called before sharing a song with another device, and the share history is then sent to the other device.

deleteSongShareHistory(trackID)
This function clears a song's share history from an Egg's internal memory. This function is generally called when a customer erases the song, or when the customer purchases the song.

storeShareData(trackID, shrHistory)
This function stores a share history for a song in an Egg's internal memory, and is generally called after the Egg receives a shared song. This function stores the current share history, and also adds information about the Egg to the share history, so that the next time the song is shared, the Egg will be reflected in the share history.

Figure 17:
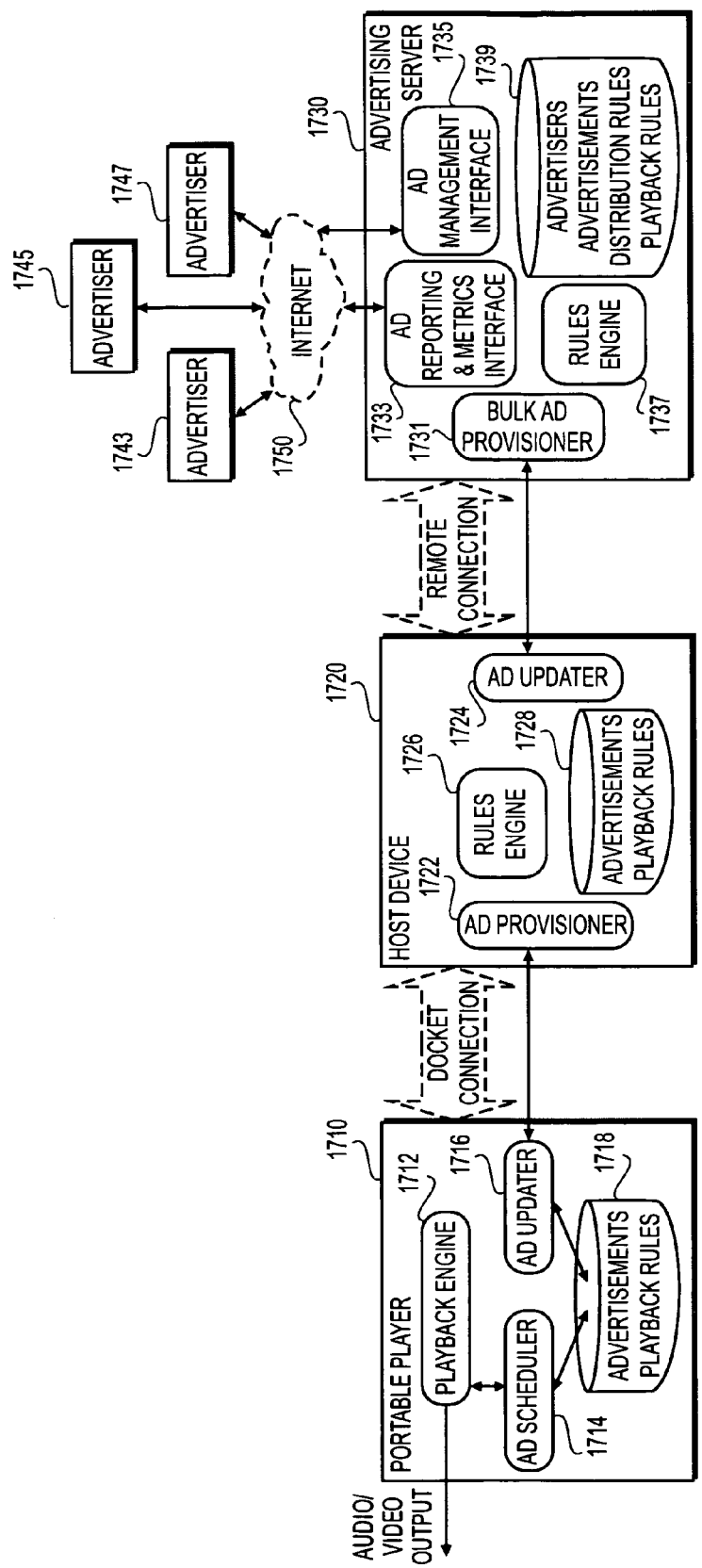
FIG. 17, which is a simplified block diagram of a system for deployment of advertisements in customer Egg players, in accordance with an embodiment of the present invention.

Embodiments of the present invention include an advertising and deployment component that provides a wide range of advertising opportunities for sponsors. Reference is now made to FIG. 17, which is a simplified block diagram of a system for deployment of advertisements in customer Egg players, in accordance with an embodiment of the present invention. Shown in FIG. 17 are three primary components; namely, (i) a portable player 1710, such as an Egg, with a playback engine 1712, (ii) a host device 1720, such as a Nest, a kiosk or a PC computer, and (iii) an advertising server 1730. The connection between Egg 1710 and host device 1720 is generally via a docked connection, when Egg 1710 is docked into a cradle of host device 1720. The connection between host device 1720 and advertising server 1730 is generally a remote connection, via a cable network, a satellite network, a cellular network, or via the Internet.

Briefly, advertiser computers, such as advertisers 1743, 1745 and 1747, upload ads, distribution rules and playback rules to advertising server 1730. Playback rules govern when advertisements are to be played. Distribution rules govern the process of moving ads from advertising server 1730 to appropriate players 1710. Distribution rules specify relationships between ads and content, so that promotional content is associated with one or more desired ads. Distribution rules are also used to specify relationships between ads and player types, so that a targeted set of players 1710 receive specific advertisements. Advertising server 1730 transmits the ads and rules to host device 1720, for deployment in players 1710 when the players connect to the host device. Advertiser computers 1743, 1745 and 1747 are generally connected to advertising server 1730 via the Internet.

Advertisers may sponsor songs, or Egg players 1710 themselves with pre-loaded content and with sponsored branding on their cases. Advertisers may distribute sponsored content to consumers' Eggs 1710 along with ads. An ad management interface 1735 provides a web interface through which a sponsor manages ads that are deployed in consumers' Eggs 1710. Ad reporting & metric interface 1733 provides a web interface through which a sponsor receives tracking information including inter alia how many ad impressions were generated.

Ad management interface 1735 gives the sponsor much flexibility in controlling his advertising. The sponsor can use ad management interface 1735 to submit ads, to remove ads, to update ads and to insert new ads; and to submit sponsored music content, to remove sponsored music content, to update sponsored music content and to insert new sponsored content. The sponsor can also use ad management interface 1735 to define rules in terms of conditions that trigger the ads to be played, and to designate which rules are to be used for which sponsored Eggs, as described in detail hereinbelow. When Customers' sponsored Eggs 1710 are connected to a host device 1720, ads and sponsored content and rules are transferred to the Eggs. Conversely, statistical information about ads that the customers heard on their Eggs is transferred to advertising server 1730.

In accordance with an embodiment of the present invention, a ad may be designated so that a customer cannot fast forward through the ad or skip the ad, and so that a customer cannot delete the ad from his Egg player without losing valuable content.

In accordance with an embodiment of the present invention, an advertiser may distribute Eggs with branded casing and with pre-loaded music to customers as part of an advertising campaign. For example, the advertiser may distribute the Eggs at a sponsored event such as at a concert or at a sports competition. Advertising server 1730 displays information about the campaign to the sponsor in ad management interface 1733, through which the advertiser manages his campaign, adding new ads and deploying new content to customers who received their Eggs 1710 through the campaign.

For deployment of ads, an advertiser 1743, 1745 or 1747 uploads the ads he wants to use in the advertising campaign to advertisement server 1730, groups the ads into ad groups, defines rules specifying events that trigger playing of the ads, and activates the ads and their rules for deployment to the customers' Eggs. For deployment of music content, the advertiser uploads the music he wants to use in the advertising campaign, selects one or more rules to use with the music content, and activates the content and its rules for deployment to the sponsored customers' Eggs 1710.

An embodiment of the present invention uses five types of objects; namely, (i) advertisements, (ii) ad groups, (iii) rules, (iv) content and(v) campaigns, all as described in detail hereinbelow with reference to TABLES IV-XII. Objects are reusable, so that, e.g., one advertisement can be used in multiple ad groups, one ad group can be used in multiple rules, and one rule can be used in multiple campaigns. As such, each object need only be created once, and can be reused with other objects. Each object as its own section in ad management interface 1735, where the advertiser is able to add, modify and delete instances of the object.

An advertisement object includes an audio file, with a jingle or spoken words or both, that is to be played when an appropriate event occurs, or a video file for video-capable Eggs 1710. In addition to the audio file, the advertisement object includes meta-data about the ad, such as whether to play the ad before, during or after a song, and information to display on the Egg's LCD screen while the ad is playing. The advertisement object section in ad management interface 1735 enables the advertiser to upload new ads, to edit current ads, and to delete old ads. TABLE IV indicates some data members of an advertising object.

TABLE IV

| Advertising object data members | |
|---|---|
| ad_id | Number |
| name | Text |

TABLE IV-continued

| Advertising object data members | |
|---|---|
| description | Text |
| play_type | 'BEFORE', 'DURING', 'AFTER' |
| screen_text | Text |
| screen_image_filespec | Text |
| ad_audio_filespec | Text |

The member ad_audio_filespec is a location of the audio file on disk, and the member screen_image_filespec is a location of the file for the image that is displayed on the Egg's LCD screen when the ad is played. Similarly, the member screen_text is the text that is displayed on the LCD screen when the ad is played. The member play_type indicates when the ad should be played; before the song, during the song superposed on the audio, or after the song.

An ad group object is used to group ads together, and is useful in associating one rule with multiple ads. In accordance with an embodiment of the present invention, each ad in an ad group is assigned a probability frequency between 0 and 1, the frequencies adding up to one. The frequency assigned to an ad within an ad group determines the percentage of time that ad is played with a rule within the ad group is invoked. TABLE V indicates some data members of an ad group object, and TABLE VI indicates some data members of individual entries within an ad group object.

TABLE V

| Ad group object data members | |
|---|---|
| ad_group_id | Number |
| name | Text |
| description | Text |

TABLE VI

| Ad group entry data members | |
|---|---|
| ad_group_id | Number |
| ad_id | Number |
| weighting | Number |

A rule object is used to prescribe the conditions under which an ad or an ad group is played. A rule object includes a condition specifying when an ad should be played, and an ad or an ad group specifying which ads to play when the condition is satisfied. A rule object is of the general form
if condition=true
then play ad from ad group In accordance with an embodiment of the present invention, rules are assigned priorities, which are used to determine while rule to execute in case two or more rule conditions are satisfied at once. A rule can also specify if another ad should be played after its ad is played.

A rule condition may include logical combinations of individual comparisons and tests. Individual comparisons and tests include inter alia

| | |
|---|---|
| current song ID = | |
| current song label ID = | |
| current song artist ID = | |
| current song album ID = | |
| current song genre ID = | |
| current weekday = | |
| number of rule invocations = | |
| current song purchase status = | purchasable/non-purchasable |
| current song's ownership = | Purchase/Recorded/Try & Buy |

-continued

| | |
|---|---|
| current time satisfies the condition | _____ |
| current date satisfies the condition | _____ |
| current song play count satisfies the condition | _____ |
| time since first rule invocation satisfies the condition | _____ |
| current ad/ad group has been played les than _____ times during the last_____minutes/hours/days/songs | |

Each of the above comparisons and tests are made a run-time, i.e., at song play time. Each comparison and test evaluates to true or false, and multiple comparisons and tests can be logically combined to form a complex advertising rule condition. TABLE VII indicates some data members of a rule object.

TABLE VII

Rule object data members

| | |
|---|---|
| rule_id | Number |
| advertiser_id | Number |
| condition_id | Number |
| ad_group_id | Number |
| priority_level | Number |
| play_another_ad | yes/no |
| times_invoked | Number |
| first_invoked_timestamp | date/time |
| name | Text |
| description | Text |

A content object represents new media that an advertiser wants to offer to a customer. Associated with the content is a set of rules that are also sent to the customer along with the content. The content object section of ad management interface 1735 enables the advertiser to upload a new song, to set its ownership to Owned or to Try & Buy, and to select one or more ad rules. TABLE VIII indicates some data members of a content object, and TABLE IX indicates joining of content with rules.

TABLE VIII

Content object data members

| | |
|---|---|
| content_id | Number |
| advertiser_id | Number |
| content_ownership | 'OWNED', 'TRY & BUY' |
| content_filespec | Text |
| name | Text |
| description | Text |

TABLE IX

Content joined with rules

| | |
|---|---|
| content_id | Number |
| rule_id | Number |

A campaign object is used to deploy content and rules. An advertiser sets up a campaign for each group of media players that the advertiser distributes, such as one group of media players for a concert tour campaign, and another group of media players for a basketball team campaign. Each Egg player that the advertiser distributes is associated with an appropriate campaign. As such, the advertiser can deploy ads and rules to a large targeted group of customers at once. The campaign object section of ad management interface 1735 enables advertisers to activate pre-defined rules and pre-uploaded content for a specific campaign. An advertiser may have multiple campaigns, and may re-use the same rules and content for two or more campaigns. TABLE X indicates some data members of a campaign object, TABLE XI indicates some data members of individual advertising content within a campaign object, and TABLE XII indicates some data members of individual rules within a campaign object.

TABLE X

Campaign object data members

| | |
|---|---|
| campaign_id | Number |
| advertiser_id | Number |
| player_id_range_start | Number |
| player_id_range_end | Number |
| name | Text |
| description | Text |

TABLE XI

Campaign data members for content entries

| | |
|---|---|
| entry_id | Number |
| campaign_id | Number |
| content_id | Number |

TABLE XII

Campaign data members for rule entries

| | |
|---|---|
| entry_id | Number |
| campaign_id | Number |
| rule_id | Number |

After an advertiser deploys a campaign, advertising server 1730 tracks the campaign by monitoring inter alia the following statistics:
  number of users that received an ad or a piece of content;
  when the new ad or content was received on a customer's Egg;
  number of times a rule was invoked/an ad was played/an ad group was played;
  when a rule was invoked/an ad was played/an ad group was played; and
  number of times a user connected to receive new content.
Advertising server 1730 also enables an advertiser to simulate his campaign by running the campaign on simulated groups of customers, including inter alia:
  commuters, who listed to their Egg players during commute time;
  avid listeners, who listen to music multiple times a day;
  infrequent listeners, who listen to music randomly and infrequently; and
  classical music/rock & roll/rap fans, who play music of that genre.
If an advertiser, for example, sets too high of a priority for a rule that frequently gets invoked, then other rules and ads may not get played. A campaign simulation would detect such a problem before the advertiser deploys the campaign.

Advertising server 1730 includes a bulk ad provisioner 1731 for transmitting ad, ad groups and rules to host device 1720. Transmission of ads from advertising server 1730 to host device 1720 may be performed in bulk for a plurality of players 1710, or individually for an individual player 1710, when player 1710 is being updated. Advertising server 1730 also includes its own rules engine 1737, used for simulation of campaigns, as described hereinabove. Advertising server 1730 also includes a database of advertisers 1739, advertisements, distribution rules and playback rules.

Host device 1720 includes an ad provisioner 1722 for transmitting ads to Egg player 1710, and an ad updater for updating ads and rules on Egg player 1710. Host device 1720 also includes a rules engine 1726 for evaluating conditions therefor and enforcing rules. Host device 1720 also includes a database 1728 of advertisements and rules.

Player 1710 includes a database 1718 of advertisements and rules. Player 1710 also includes an ad scheduler 1714, for scheduling playback of ads in database 1718 according to their rules. Ad scheduler 1714 is invoked periodically, such as before a song is played. Ad scheduler 1714 evaluates rules to determine if ads should be played, and schedules their playback accordingly. If a rule involves an ad group, then ad scheduler 1714 selects one of the ads in the ad group based on the value of the ad's weighting data member from TABLE VI.

Player 1710 also includes an ad updater 1716 for updating ads, ad groups and rules in database 1718.

Figure 18:
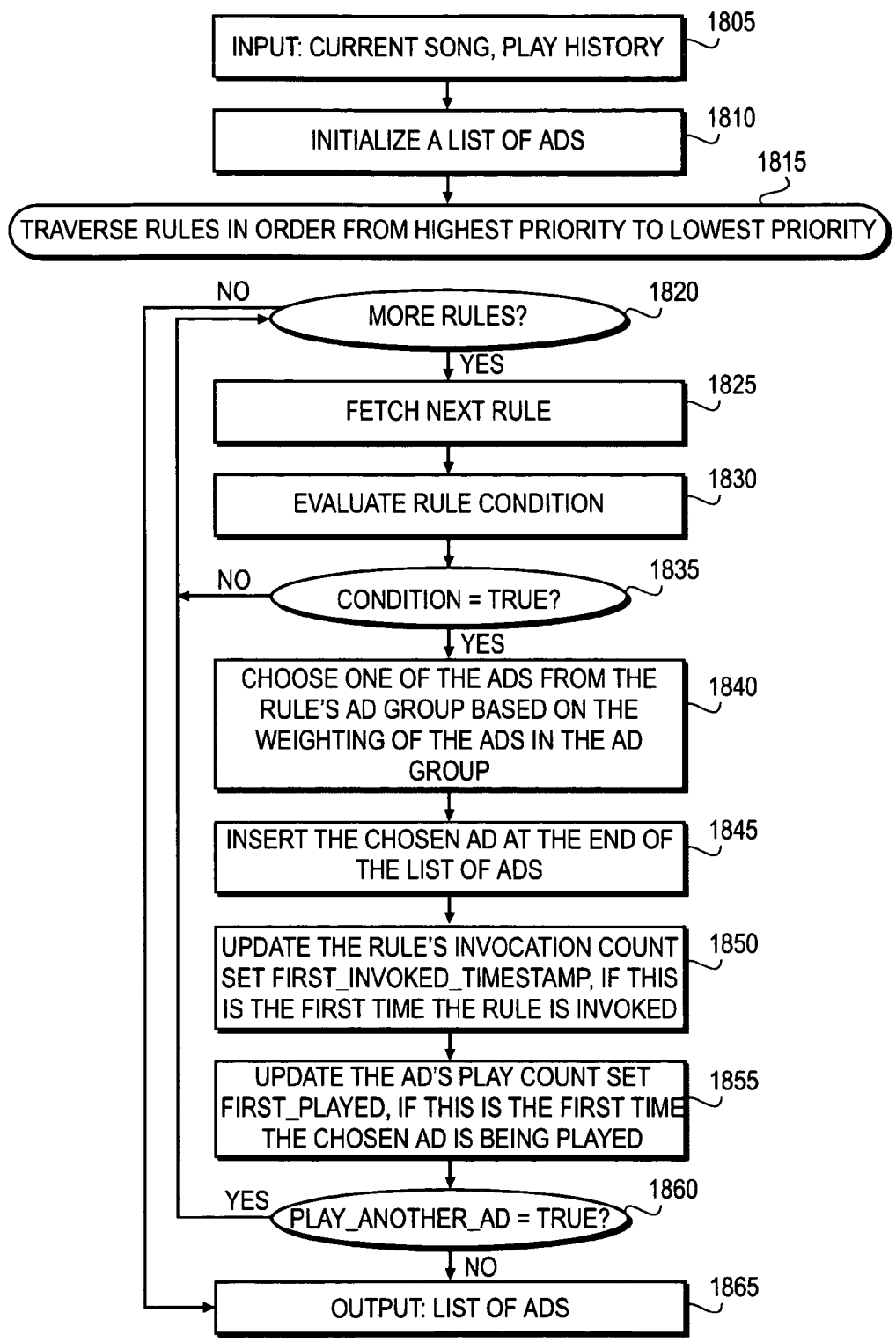
FIG. 18 is a simplified flowchart of a method for scheduling advertisements according to evaluation of playback rules, in accordance with an embodiment of the present invention.

Reference is now made to FIG. 18, which is a simplified flowchart of a method for scheduling advertisements according to evaluation of playback rules, used by ad scheduler 1714, in accordance with an embodiment of the present invention. At operation 1805 the ad scheduler is invoked, and receives as input a reference to a current song and its play history. The ad scheduler generates a list of advertisements to be played as its output. At operation 1810 the ad scheduler initializes this list, as a currently empty list.

At operation 1815 the ad scheduler begins a loop traversing rules in order from highest priority to lowest priority. The loop spans operations 1820-1860. At operation 1820 the ad scheduler determines if there are more rules to be processed. If not, then the loop ends, and the ad scheduler returns the list of ads at operation 1865 as its output. If there are more rules to be processed, then at operation 1825 the ad scheduler fetches the next rule. As mentioned hereinabove, each rule has a condition and an ad or an ad group. Since an ad can be considered as a special case of an ad group that contains a single ad with a weighting of 1, it is assumed in what follows that the rule involves an ad group.

At operation 1830 the ad scheduler evaluates the rule's condition. The condition may involve the song's play history, a reference to which was passed to the ad scheduler as input. At operation 1835 the ad scheduler branches depending on whether the condition evaluated at operation 1830 is true or false. If the condition is false, then the rule is not applied and the ad scheduler returns to the beginning of the loop at operation 1820. If the condition is true, then the rule is to be applied, and at operation 1840 the ad scheduler selects one of the ads from the ad group associated with the rule, based on the weightings assigned to the ads within the ad group. Such selection may be a random selection with the weightings used as probabilities, or it may be a deterministic selection in a manner such that the frequency of occurrence of each ad within the ad group is equal to, or approximately equal to, the ad's weighting.

At operation 1845 the ad scheduler inserts the ad chosen at operation 1840 at the end of the list of advertisements. At operation 1850 the ad scheduler updates the chosen rule's times_invoked data member as per TABLE VII. In addition, if this is the first time the rule is invoked, then the ad scheduler also updates the rule's first_invoked_timestamp data member as per TABLE VII. At operation 1855 the ad scheduler updates the chosen advertisement's play count. In addition, if this is the first time the chosen advertisement is played, then the ad scheduler also updates the advertisement's first played time.

At operation 1860 the ad scheduler checks if the rule's play_another_ad data member, as per TABLE VII, is true. If so, then the ad scheduler returns to operation 1820 to process the next rule. Otherwise, the ad scheduler terminates at operation 1865 and returns its list of advertisements as output.

It may thus be appreciated that the advertising system of FIG. 17 provides for a wide range of advertising opportunities. One such opportunity is a pre-loaded demo, whereby a sponsor distributes branded promotional players with pre-loaded content and advertisements. A second such opportunity is a loyalty reward program, whereby loyal customers are given free songs with advertisements associated therewith. A third such opportunity is label promotion, whereby a music label company distributes free songs with associated advertisements at retail outlets. In case of joint sponsors, advertisements from each sponsor can be organized, for example, into multiple ad groups and triggered in alternate succession.

As an example scenario, suppose company X sponsors a concert tour of rock band Y. Attendees of the concert receive a free Egg player with company X's logo imprinted on the Egg's casing. Pre-loaded on the Eggs is the latest album of rock band Y, in a digital rights managed WMA format, that the attendee receives for free. When the attendee plays the pre-loaded songs, he periodically hears advertisements for company X.

Company X uses ad management interface 1735 to update its advertisements from time to time. Company X offers new free songs of rock band Y as an incentive to have the attendees connect their Eggs to a host device, such as a kiosk or a home PC, and receive the new advertisements. When an attendee connects his Egg to the host device, he automatically receives the new songs and the new advertisements. In turn, his Egg sends statistical information about the advertisements he has heard to administration server 1730.

Company X uses ad reporting & metrics interface 1733 to receive statistics about the number of ad impressions they are getting.

In accordance with an embodiment of the present invention, an application programming interface (API) for Eggs is provided, in order for third parties to use the advertising features of the present invention. Inter alia, the Egg API includes the following functions.

addAdvertisement(newAd)
This function is used to add a new advertisement to an Egg's internal collection of advertisements.

addRule(newRule)
This function is used to add a new rules to an Egg's internal collection of rules.

addAdGroup(newAdGroup)
This function is used to add a new ad group to an Egg's internal collection of ad groups.

deleteAdvertisement(adID)
This function is used to delete an old advertisement from an Egg's internal collection of advertisements.

deleteRule(ruleID)
This function is used to delete an old rule from an Egg's internal collection of rules.

deleteAdGroup(adGroupID)

This function is used to delete an old ad group from an Egg's internal collection of rules.

getAdvertisementList( )

This function is used to get a list of advertisement IDs from an Egg's internal collection of advertisements. This function is generally called while the Egg is connected to a host, to let the host know which advertisements the Egg already has loaded therewithin.

getRuleList( )

This function is used to get a list of rule IDs from an Egg's internal collection of advertisements. This function is generally called while the Egg is connected to a host, to let the host know which rules the Egg already has loaded therewithin.

getAdGroupList( )

This function is used to get a list of ad group IDs from an Egg's internal collection of advertisements. This function is generally called while the Egg is connected to a host, to let the host know which ad groups the Egg already has loaded therewithin.

shouldPlayAdvertisement(songID, artistID, albumID)

This function is called before an Egg plays a song. The Egg evaluates the rules from its internal collection of rules, and determines if there is an advertisement that should be played. If so, then the Egg saves an internal note of which advertisement to play, and the function returns true. If not, then the function returns false.

getAdvertisementToPlay(adAudioData)

This function is called after a successful call to shouldPlayAdvertisement. Based on the internal note that was saved, the function sets adAudioData to point to the start of the ad audio. In accordance with an embodiment of the present invention, adAudioData is located in a protected store, so that a customer cannot erase or modify it. This function returns the ID of the advertisement to play, and also updates the tracking information of the advertisement, ad group and rule that were involved in selecting the advertisement to be played.

getAdvertisementTrackingInfo( )

This function is used to get a list of times that advertisements were played. This function is generally called in order to get tracking information to send to a host, for the host to send to the advertising server.

clearAdvertisementTrackingInfo( )

This function is used to clear advertisement tracking information after the information is successfully uploaded to the advertising server, and is generally called to prevent the same ad impressions from being counted more than once.

getTime( )

This function is used to get the current time from an Egg's clock.

setTime(newTime)

This function is used t set the current time in an Egg's clock.

getDeviceID( )

This function is used to get an Egg's unique ID.

In addition to the API for Eggs provided hereinabove, an API for hosts, including kiosks, Nests and personal computers, is also provided, in order for third parties to use the advertising features of the present invention. Inter alia, the host API includes the following functions.

updateDeviceAds(deviceID, newAds, newAdGroups, newRules, delAds, delAdGroups, delRules)

This function is used to communicate with the advertising server and check whether there are new ads, new rules and new ad groups for the specified customer Egg. The ads, rules and ad groups that the host retrieves will be automatically placed onto the customer's Egg, without prompting the customer. This function is also used to communicate ads, rules and ad groups that are to be deleted from the customer's Egg. The advertising server determines which campaign the customer's Egg belongs to, and sends or deletes ads, rules and ad groups accordingly.

getNewContentOffers(deviceID, newAds, newAdGroups, newRules, newcontent)

This function checks with the advertising server whether there is new content being offered for the host that makes the function call, or for the specified customer Egg. The retrieved content is then offered by the host to the customer. If the customer accepts the host's offer, then the advertisements, ad groups, rules and content are placed onto the customer's Egg. The advertising server determines which campaign the customer's Egg belongs to, and sends ads, ad groups and rules accordingly.

sendTrackingInfo(trackingInfo)

This function is used to send tracking information, including advertisement play history, to the advertising server. If successful in sending the data, the function returns true; otherwise, it returns false.

putAdvertisement(newAd)

This function sends an advertisement to the host.

putRule(newRule)

This function sends a rule to the host.

putAdGroup(newAdGroup)

This function sends an ad group to the host.

putContent(newContent)

This function sends content to the Nest.

getHostID( )

This function gets the unique ID assigned to the host.

addAddPlayToHistory( )

This function adds information to an Egg's internal ad playback history when an advertisement is played.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for enabling a user to listen to songs on a network-enabled device, comprising:

a plurality of network-enabled devices, each device comprising:

an embedded receiver for receiving at least one sung list, and for receiving music streamed over a wireless network, wherein the at least one song list lists songs from a collection of songs previously registered with the network-enabled device in a registry data store of a tracking server;

list navigation software, for navigating the at least one sung list and selecting a desired song therefrom, wherein the selected song is not currently stored in the network-enabled device;

an embedded transmitter for transmitting the song selection to the tracking server, the song selection comprising an ID for the selected song; and an embedded audio player, for playing the music streamed to the network-enabled device over the wireless network;

a tracking server, remote from said plurality of network-enabled devices and communicatively coupled with said plurality of network-enabled devices, comprising:

a registry data store comprising registration information for the plurality of network-enabled devices and respective collections of songs acquired therefor;
a receiver for receiving a song selection from a requesting network-enabled device; and
a transmitter for transmitting at least one song list to the requesting network-enabled device, and for transmitting, not via said plurality of network-enabled devices, an instruction to a media server to stream the selected song to the requesting network-enabled device, wherein the at least one song list lists songs from the collections of songs previously registered with the requesting network-enabled device in the registry data store of the tracking server; and
media server, remote from said plurality of network-enabled devices and from said tracking server and communicatively coupled with said plurality of network-enabled devices and with said tracking server, comprising:
a song data store comprising audio files for songs;
an audio streamer;
a receiver for receiving the instruction to stream from said tracking server to transmit the selected song to the requesting network-enabled device; and
a transmitter for streaming the selected song to the requesting network-enabled device, in response to said media server receiver receiving the instruction to stream, along a network path that circumvents said tracking server.

2. The system of claim wherein said tracking server receives the registration information for the requesting network-enabled device and the collection of songs acquired therefor from a media management device.

3. The system of claim 2 further comprising a scanner for scanning the media management device to identify the collection of songs acquired for the requesting netmork-enabled device.

4. The system of claim 3 wherein the media management device is a PC computer.

5. The system of claim 1 wherein said tracking server further comprises an account validator, for determining whether or not registration of the requesting network-enabled device is currently valid.

6. The system of claim 1 wherein said tracking server further comprises a song validator, for determining whether or not a digital rights management license for the selected song for the requesting network-enabled device has expired.

7. The system of claim 1 wherein the requesting network-enabled device is a cellular telephone.

8. The system of claim 1 wherein the requesting network-enabled device is a public network access device.

9. A method for a tracking server to cause music to be streamed to a network-enabled device, comprising:
registering, by a tracking server, a plurality of network-enabled devices and respective collections of songs acquired therefor;
receiving, by the tracking server, a play request from a requesting network-enabled device;
sending, by the tracking server, at least one song list to the requesting network-enabled device, in response to the received play request, wherein the at least one song list lists songs from the collection of songs previously registered for the requesting network-enabled device by the tracking server;
further receiving, by the tracking server, a selection request from the requesting network-enabled device with an ID for a selected song, wherein the selected song is not currently stored in the requesting network-enabled device; and
further sending, by the tracking server, not via the plurality of network-enabled devices, an instruction to a media server to stream the selected song to the requesting network-enabled device, along a network path that circumvents the tracking server.

10. The method of claim 9 further comprising determining, by the tracking server, whether registration of the requesting network-enabled device is currently valid prior to said sending a song list.

11. The method of claim 9 further comprising validating, by the tracking server, a digital rights management license for the selected song for the requesting network-enabled device, prior to said sending an instruction.

12. The method of claim 9 further comprising receiving, by the tracking server, the registration information for the requesting network-enabled device and the collection of songs acquired therefor from a media management device.

13. The method of claim 12 wherein the media management device is a PC computer.

14. The method of claim 9 wherein the requesting network-enabled device is a cellular telephone.

15. The method of claim 9 wherein the requesting network-enabled device is a public network access device.

16. A system for enabling a user to listen to songs on a network-enabled device, comprising:
a plurality of network-enabled devices, each device comprising:
an embedded receiver for receiving music streamed over a wireless network;
list navigation software, for navigating at least one song list and selecting a desired song therefrom, wherein the at least one song list fists songs from a collection of songs previously registered with the network-enabled device by a tracking server, and wherein the selected song is not currently stored in the network-enabled device;
an embedded transmitter for transmitting the song selection to the tracking server, the song selection comprising an ID for the selected song; and
an embedded audio player, for playing the music streamed to the network-enabled device over the wireless network;
a tracking server, remote from said plurality of network-enabled devices and communicatively coupled with said plurality of network-enabled devices, comprising:
a registry data store comprising registration information for the plurality of network-enabled devices and respective collections of songs acquired therefor;
a receiver for receiving a song selection from a requesting network-enabled device; and
a transmitter for transmitting, not via the plurality of network-enabled devices, an instruction to a media server to stream the selected song to the requesting network-enabled device; and
a media server, remote from said plurality of network-enabled devices and from said tracking server and communicatively coupled with said plurality of network-enabled devices and with said tracking server, comprising:
a song data store comprising audio files for songs;
an audio streamer;
a receiver for receiving the instruction to stream from said tracking server to transmit the selected song to the requesting network-enabled device; and a transmitter for streaming the selected song to the requesting network-enabled device, in response to said media server receiver receiving the instruction to stream, along a network path that circumvents said tracking server.

17. The system of claim 16 wherein said tracking server further comprises an account validator, for determining whether or not registration of the requesting network-enabled device is currently valid.

18. The system of claim 16 wherein said tracking server further comprises a song validator, for determining whether or not a digital rights management license for the selected song for the requesting network-enabled device has expired.

19. The system of claim 16 wherein the requesting network-enabled device is a cellular telephone.

20. The system of claim 16 wherein the requesting network-enabled device is a public network access device.

21. A method for a tracking server to cause music to be streamed to a network-enabled device, comprising:

registering, by a tracking server, a plurality of network-enabled devices and respective collections of songs acquired therefor;

receiving, by the tracking server, a selection request from a requesting network-enabled device with an ID for a selected song from among the collection of songs previously registered for the requesting network-enabled device by the tracking server, wherein the selected song is not currently stored in the requesting network-enabled device; and sending, by the tracking server, not via the plurality of network-enabled devices, an instruction to a media server to stream the selected song to the requesting network-enabled device along a network path that circumvents the tracking server.

22. The method of claim 21 further comprising validating, by the tracking server, a digital rights management license for the selected song for the requesting network-enabled device prior to said sending an instruction.

23. The method of claim 21 wherein the requesting network-enabled device is a cellular telephone.

24. The method of claim 21 wherein the requesting network-enabled device is a public network access device.

* * * * *